US009937838B2

(12) United States Patent
Ito et al.

(10) Patent No.: US 9,937,838 B2
(45) Date of Patent: Apr. 10, 2018

(54) CUSHION BODY

(71) Applicants: TOYO SEAT CO., LTD., Osaka (JP); JSP Corporation, Tokyo (JP)

(72) Inventors: Hiroyuki Ito, Hiroshima (JP); Seishiro Murata, Tokyo (JP); Satoru Shioya, Tochigi (JP); Takashi Imai, Hiroshima (JP)

(73) Assignees: TOYO SEAT CO., LTD., Osaka (JP); JSP CORPORATION, Tokyo (JP)

( * ) Notice: Subject to any disclaimer, the term of this patent is extended or adjusted under 35 U.S.C. 154(b) by 9 days.

(21) Appl. No.: 14/899,385

(22) PCT Filed: Jun. 17, 2014

(86) PCT No.: PCT/JP2014/066027
§ 371 (c)(1),
(2) Date: Dec. 17, 2015

(87) PCT Pub. No.: WO2014/203891
PCT Pub. Date: Dec. 24, 2014

(65) Prior Publication Data
US 2016/0152168 A1 Jun. 2, 2016

(30) Foreign Application Priority Data
Jun. 18, 2013 (JP) .................. 2013-127514

(51) Int. Cl.
*A47C 21/00* (2006.01)
*B60N 2/70* (2006.01)
(Continued)

(52) U.S. Cl.
CPC ............ *B60N 2/7094* (2013.01); *A47C 7/021* (2013.01); *A47C 7/18* (2013.01); *A47C 27/14* (2013.01);
(Continued)

(58) Field of Classification Search
CPC ...................................................... A47C 21/00
(Continued)

(56) References Cited

U.S. PATENT DOCUMENTS 3,222,697 A * 12/1965 Scheermesser ...... A47C 27/144
297/452.48
4,815,155 A * 3/1989 Sommers ............... A47C 21/06
5/417
(Continued)

FOREIGN PATENT DOCUMENTS

DE 202011002218 U1 5/2011
FR 1372493 A 9/1964
(Continued)

OTHER PUBLICATIONS

European Search Report dated Dec. 5, 2016 for PCT/JP2014/066027.

*Primary Examiner* — Fredrick C Conley
(74) *Attorney, Agent, or Firm* — Bacon & Thomas, PLLC

(57) ABSTRACT

The present invention solves the problem of realizing a lighter cushion body that has ample cushioning properties when a person sits or lies thereon by: providing a plurality of rod-shaped or flat plate-shaped support bodies (2) comprising a synthetic resin foam that has a bending deflection amount of 20 mm or more as measured according to the method described in JIS K7221-2:2006 and a pressing force of 2-100 N at 20 mm of deflection, and legs (3) on which the support bodies (2) are placed or fixed; using the support bodies and the legs to form a space (5) that makes it possible to bend and deform the support bodies; and arranging the plurality of rod-shaped or flat plate-shaped support bodies (2) in a row so as to be deformable.

18 Claims, 23 Drawing Sheets

(51) Int. Cl.
*A47C 27/14* (2006.01)
*A47G 9/10* (2006.01)
*A47C 7/02* (2006.01)
*B60N 2/64* (2006.01)
*A47C 7/18* (2006.01)

(52) U.S. Cl.
CPC ............... *A47G 9/10* (2013.01); *B60N 2/643* (2013.01); *B60N 2/646* (2013.01); *A47G 2009/1018* (2013.01)

(58) Field of Classification Search
USPC .............................................. 5/110–112, 114
See application file for complete search history.

(56) References Cited

U.S. PATENT DOCUMENTS

| 2002/0052426 A1 | 5/2002 | Tarantino et al. |
| 2004/0201269 A1 | 10/2004 | Tarantino et al. |
| 2009/0013472 A1 | 1/2009 | Koffler et al. |

FOREIGN PATENT DOCUMENTS

| JP | 2002028044 A | 1/2002 |
| JP | 2003325273 A | 11/2003 |
| JP | 2004049809 A | 2/2004 |
| JP | 2009279086 A | 12/2009 |
| WO | 03079859 A1 | 10/2003 |
| WO | 2005115201 A1 | 12/2005 |

\* cited by examiner

B-B SECTION

W-W SECTION

W-W SECTION

W-W SECTION

X-X SECTION

B-B SECTION

B-B SECTION

B-B SECTION

B-B SECTION

CUSHION BODY

TECHNICAL FIELD

The present invention relates to a cushion body which is used as a constructing element for a vehicular seat of a vehicle, a ship and an airplane, a sofa, a chair, a floor cushion, a bed, a sleeping car, a mattress, a under a futon mattress, a pillow and a mat, which are used at the seating time and the supine posture time of a person, the cushion body promoting weight reduction, being rich in recyclability and being rich in comfortable sit feeling and comfortable sleep feeling.

BACKGROUND ART

Generally, the cushion body has a structure in which a soft cushion material such as polyurethane foam is mounted on a structure body finally supporting pressure of a wire or a flat plate-like supporting body extended to a frame body, and a whole of them is covered with a surface cover. Further, the structure body does not inhere in the floor cushion and the mattress of the bed themselves, however, the floor cushion and the mattress of the bed are generally used by being mounted on the structure body such as the floor and the frame body of the bed which can support the pressure of the human body.

In the general cushion body, vibration and shock applied to the cushion material has been lightened mainly by reaction force, restoring force and deflection when the soft cushion material such as the polyurethane foam interposed between the structure body and the surface cover deflects in a compression direction.

Further, as a technique relating to the weight reduction of the seat cushion for vehicle, patent document 1 describes a technique that a seat frame exhibit a frame structure, a cross section of the seat frame exhibits a mountain shape, an inclined surface facing to a seated person is provided by forming one side of the mountain shape in an inner peripheral side of the frame shape of the seat frame, the seat frame is covered with a net having an elasticity, a peripheral edge portion of the net is provided in a tension manner so as to form a seating surface having a concave curve surface shape by being taken around from the mountain shape of the seat frame and fixed to the other side of the mountain shape, and an angle is provided between the net and the inclined surface of the seat frame.

As the other technique relating to the weight reduction, patent document 2 describes a technique relating to a seat for vehicles having a seating portion provided with a base plate which is arranged on a seat frame in an attachable and detachable manner, a block which is arranged on the base plate, a spring plate which is arranged on the block, and a surface cover 7 which covers the spring plate. The block is arranged so as to form a predetermined space between the base plate and the spring plate. The spring plate is formed by a foam which has an elasticity and is made of any of a PP (polypropylene) bead foam, a PE (polyethylene) bead foam, a PP foam, a PE foam, an AS resin (acrylonitrile-styrene copolymer resin) foam, an EVA (ethylene-vinyl acetate copolymer resin), and an polyurethane foam material. The spring plate is deflected into the predetermined space when force in a direction toward the base plate is applied.

Next, the bed mattress generally uses the polyurethane foam as the cushion material in the case that the cushion body is assembled for the bed mattress. As the technique relating to the weight reduction of the bed mattress, patent document 3 describes a technique that the supporting body is constructed by the polyurethane foam, and is provided on its surface with a plurality of concave grooves reaching both end portions in a short side direction, the concave groove has a depth 30 to 70 mm and a width 15 to 80 mm, a core material is constructed by a rectangular polyurethane foam having a thickness 10 to 40 mm and a hardness 100 to 300 N, is folded its short sides into two in a long side direction, and is fitted and supported in both end portions of its long sides to one concave groove of the supporting body, and the frame body is provided so as to surround the periphery of the supporting body.

PRIOR ART DOCUMENT

Patent Documents

Patent Document 1: Japanese Patent Unexamined Publication No. 2002-28044
Patent Document 2: Japanese Patent No. 4009490
Patent Document 3: Japanese Patent Unexamined Publication No. 2009-279086

SUMMARY OF THE INVENTION

Problem to be Solved by the Invention

In the conventional general seat cushion for vehicle, the polyurethane foam has been used as a cushion material. Since the polyurethane foam is extremely high in cushioning properties and excellent in comfort, the polyurethane foam has still been used frequently. However, there has been a problem that the polyurethane foam is inferior in recyclability. Further, the seat cushion for vehicle has been required to have not only optimum cushioning properties regardless of the occupant depending upon lightness of heaviness of his/her weight but also cushioning properties which do not apply uncomfortable feeling to a body of the occupant in relation to acceleration in up-down directions applied to the occupant with movement of a vehicle. On the other hand, it has been necessary to support the body of the occupant at an optimal position and posture for reducing tiredness due to long-time riding. The function can not be satisfied only by the very soft polyurethane foam, it is necessary to make a density of the polyurethane foam equal to or more than a certain density for obtaining a certain level of rigidity. Therefore, there has been a problem that the weight reduction does not progress.

In the technique described in the patent document 1, a net material for supporting a pressure of an occupant has been drawn in the seat frame which is arranged around the seat cushion and securely fixed thereto, and the pressure applied by the seating of the occupant has finally been supported by rigidity of the seat frame through the net material. Therefore, the structure of the seat frame has needed to have a certain strength or higher. As a result, there has been a problem that the weight of the seat frame tends to be increased and the weight reduction effect a whole is not sufficient in spite of the light weight of the net material itself which corresponds to the conventional cushion material, the weight of the seat frame tends to be increased.

Further, the cushioning properties of the net material have been obtained mainly by elongation of the material, and therefore limited. A slack has occurred due to long-time use, which has tended to deteriorate marketability. Still further, since the structure has been configured such that a flat net material is extended over the seat frame, the basic form of the seat cushion is flat, and it has been difficult to obtain a three-dimensional shape which is necessary for supporting a body of the occupant at an optimal position. As a result, there has been a problem of making the occupant uncomfortable. This has been because an unstable hammock-form net material could not stably support the body of the occupant when a lateral G has been applied to the occupant due to movement of a vehicle.

Next, in the technique of the patent document 2, the spring plate has been a plate-like foam exhibiting an approximately rectangular shape, and a plurality of grooves have been formed in a lateral direction on the occupant-seated side of the spring plate. However, flexibility could not be provided in the case that the groove portions are shallow. On the other hand, excessive tensile force has been concentrated on a slightly remaining connection part at the bottom of the groove portion and great elongation deformation is generated when the cushion material is deflected, in the case that the groove portions are deep. Therefore, it has been highly possible to cause unrestorable permanent deformation or rupture. If even a part of the connection part at the groove bottom portion is broken, the support has been lost at once and apparent hardness of the entire cushion material has been reduced rapidly, and the function as the cushion material has significantly deteriorated. Therefore, it has been actually difficult to design the deflection of the cushion material to be a certain amount or larger in order to avoid the breakage, and it has been difficult to provide sufficient fitting feeling and comfort at the seating time.

Furthermore, with regard to the technique described in the patent document 2, it has been possible to obtain individually favorable seating feeling by appropriately selecting blocks which are different in height depending upon a body built of an occupant. There has been a problem, however, that an occupant needs to change, before seated, the blocks to ones having a height appropriate to the occupant depending upon lightness or heaviness of his/her weight, which is the operation actually difficult to perform.

Next, a technique described in patent document 3 is light in comparison with the mattress using the conventional metal spring. There has been a problem, however, that the technique is inferior in recyclability and has limit to the weight reduction since the polyurethane foam is used for the supporting body 2 and the core body.

Hence, the object of the present invention is to provide a cushion body which is excellent in cushioning properties and fitting properties at the seating time and the supine posture time of a person, and is excellent in weight reduction and recyclability.

Means for Solving the Problem

In the present invention, the synthetic resin foam is indicative of a synthetic resin foam molding that is flexible to be deformed by bending and excellent in restoration properties. The bending deflection thereof measured in accordance with the method defined by Japanese Industrial Standards (JIS) K7221-2:2006 (in the atmosphere of 23° C.±2° C. and relative humidity of 50±5%, a test specimen whose skin is removed having a length of 350 mm, a width of 100 mm, and a thickness of 25 mm is subjected to a load applied at a test speed 20±1 mm/min with a distance between supporting points 6 of 300 mm until the deflection reaches 90 mm at the maximum, during which the load deflection curve is recorded) is equal to or larger than 20 mm, and the load when deflected by 20 mm is 2 to 100 N. More specifically, the synthetic resin foam is indicative of a polypropylene foam, a polyethylene foam, other polyolefin resin foams, a modified polystyrene resin foam, or the like. The synthetic resin foam contains a bead foam molding exemplified by a polypropylene bead foam molding, a polyethylene bead foam molding, and the like.

More specifically, one preferable material to be selected is the material whose sample can be restored from deformation by 90% or higher just after the pressure is released after a rod-form or flat plate-form test specimen of the sample having a length of approximately 400 mm is held at the part of both ends thereof while the center of the test specimen of the sample being pressed down about 25 mm by a load for 30 minutes. Alternatively, another preferable material to be selected is the material whose sample has the residual distortion (also referred to as "residual displacement amount") measured to be equal to or smaller than a predetermined amount after the center portion of the sample held at the part of both ends thereof is pressed down repetitively a predetermined number of times and deformed in accordance with the test conventionally performed for the seat cushion made of a polyurethane foam.

As material satisfying such conditions, for example, a polypropylene foam with density of 0.06 $g/cm^3$ to 0.015 $g/cm^3$, and more preferably with density of 0.035 $g/cm^3$ to 0.015 $g/cm^3$, a polyethylene foam with density of 0.08 $g/cm^3$ to 0.03 $g/cm^3$, or the like are preferable. On the other hand, a hard polyurethane foam, a polystyrene foam, and the like, which are poor in flexibility and possibly ruptured easily due to bending deformation, are not favorable.

The present inventors have considered materials to achieve the weight reduction. As an example of the material capable of substituting a polyurethane foam having an open cell structure, the synthetic resin foam generally having a closed cell structure had the advantages of being light, excellent in rigidity, easy to recycle, and the like in comparison with the polyurethane foam conventionally and generally used as a cushion material. When the deflection and restoring force in a compression direction were used for cushion, however, the reaction force tended to increase rapidly with deformation of the foam due to repulsive force of contained air. The synthetic resin foam is therefore inferior in comfort due to a lack of cushioning properties, which causes hard feeling.

Furthermore, when the synthetic resin foam generally having a closed cell structure was deflected in a compression direction and used as a cushion material, similarly to the polyurethane foam, such a synthetic resin gradually lost restoring force with long-time use, and creep occurred. This was caused mainly by fatigue due to repetitive deformation of a resin film constituting bubbles and reduction of pressure of contained air. The synthetic resin foam was therefore not favorable as material for a cushion, which is used for a long time.

By analysis of the physical properties of the synthetic resin foam from various viewpoints, the inventors have found that it is optimal to adopt the method using, for a cushion material, the bending deformation and restoration properties of supporting body to be described later made of a synthetic resin foam capable of being deformed by bending and excellent in restoration properties, instead of the structure body, which has been used conventionally as a cushion material, to be deflected in a compression direction, and has achieved the present invention.

In order to solve the problems described in "Problem to be Solved by the Invention", the invention of a cushion body 1 described in a first aspect is a cushion body 1 which is provided with a plurality of supporting bodies 2 of rod-like elements 10 or flat plate-like elements 11 which are constructed by a synthetic resin foam having a bending deflection amount equal to or larger than 20 mm and a load 9 between 2 and 100 N at the 20 mm bending deflection time, both the bending deflection amount and the load being measured in accordance with a method described in JIS K7221-2: 2006, and the cushion body 1 is structured such that a space portion 5 is formed below the supporting bodies 2 so that the supporting bodies 2 are allowed to be deformed by bending, and a plurality of supporting bodies 2 are lined up so that they can be deformed by bending.

A cushion body 1 described in a second aspect is the cushion body according to the first aspect, wherein a leg body 3 supporting the supporting bodies 2 is provided, the supporting bodies 2 are fitted to the leg body, mounted to the leg body, fixed to the leg body or integrally formed with the leg body, and the supporting bodies 2 are constructed as a cantilever beam structure, a both-end supported beam structure or a three-point or more supported structure.

A cushion body 1 described in a third aspect is the cushion body according to the first aspect, wherein a frame 50 supporting the supporting bodies 2 is provided, the supporting bodies 2 are fitted to the frame 50, mounted to the frame 50 or fixed to the frame 50, and the supporting bodies 2 are constructed as a cantilever beam structure, a both-end supported beam structure or a three-point or more supported structure.

A cushion body 1 described in a fourth aspect is the cushion body according to any one of the first to third aspects, wherein the supporting body 2 is formed into at least any one shape of a linear shape, a curved shape and a bent shape constructed by combination of straight line portions obtained by bending straight lines at optional angles, in a plane view in the case that a surface coming into contact with the seated person or the supine posture person is an approximately horizontal surface, or in a front view in the case that the surface coming into contact with the seated person is an approximately vertical surface.

A cushion body 1 described in a fifth aspect is the cushion body according to any one of the first to fourth aspects, wherein the supporting body 2 is constructed as a laminated structure obtained by laminating and integrating the same or different materials, or a structure obtained by forming every position with the same or different materials and integrating them.

A cushion body 1 described in a sixth aspect is the cushion body according to any one of the first to fifth aspects, wherein on the basis of intension of an expected load applied to the positions of the supporting body 2 and a desirable deformation amount for supporting the load, a thickness of the supporting body 2 is made smaller for making section modulus of the position small in the case that the deformation amount is enlarged every position of the supporting body 2, and the thickness is set larger for making the section modulus of the position large in the case that the deformation amount is suppressed.

A cushion body 1 described in a seventh aspect is the cushion body according to any one of the first to sixth aspects, wherein the supporting body 2 is provided with through holes 8 in a front-rear direction, a right-left direction or an up-down direction.

A cushion body 1 described in an eighth aspect is the cushion body according to any one of the first to seventh aspects, wherein projections 15 or protrusions 16 are provided in a protruding manner on a surface in a side of the supporting body 2 with which the person comes into contact.

A cushion body 1 described in a ninth aspect is the cushion body according to any one of the first to eighth aspects, wherein a sub-supporting body 4 constructed by an elastic body is arranged in a direction in which the supporting body 2 is pressed, so as to suppress the deflection amount caused by the bending deformation of the supporting body 2 by being separated from the supporting body 2 or being brought into contact with the supporting body 2.

A cushion body 1 described in a tenth aspect is the cushion body according to any one of the first to ninth aspects, wherein the supporting body 2 is constructed as a multilayer structure and a gap 43 is provided between the layers.

A cushion body 1 described in an eleventh aspect is the cushion body according to any one of the first to tenth aspects, wherein projections 15 and/or protrusions 16 are provided in a protruding manner on a rear face of the supporting body 2 or a surface in the supporting body 2 side of a rear surface portion facing to the supporting body 2 so that leading end portions of the projections 15 and/or the protrusions 16 are separated from the rear surface portion or the rear face of the supporting body 2 facing thereto.

A cushion body 1 described in a twelfth aspect is the cushion body according to any one of the first to eleventh aspects, wherein a columnar body 18 having smaller reaction force at the compression time than the leg body 3 is provided in a protruding manner on a rear face of the supporting body 2 or a surface in the supporting body 2 side of a rear surface portion facing to the supporting body 2 so that a leading end portion of the columnar body 18 is brought into contact with the rear surface portion or the rear face of the supporting body 2 facing thereto.

A cushion body 1 described in a thirteenth aspect is the cushion body according to the twelfth aspect, wherein the columnar body 18 is constructed by at least one of a means which is made of a softer material than the leg body 3, a means which is formed into a tapered shape in its leading end portion, a means which is formed into a bent shape, and a means which has a smaller cross sectional area than the leg body 3, thereby making the reaction force smaller than the reaction force at the compression time of the leg body 3.

A cushion body 1 described in a fourteenth aspect is the cushion body according to any one of the second and fourth to thirteenth aspects, wherein the leg body 3 has a shape which is bent at a single time or plural times, on a line which connects a supporting point in one end side coming into contact with the supporting body 2 and a supporting point of the leg body leading end in the other end side.

A cushion body 1 described in a fifteenth aspect is the cushion body according to the fourteenth aspect, wherein the leg body 3 is pressed and stopped its one end in the supporting body 2 side by the supporting body 2, and is inhibited its other end from moving in a pressing direction generated by the seated person or the supine posture person, and the leg body 3 is obtained by independently or continuously arranging the leg body 3 formed into an approximately single linear shape structured such that a supporting point in one end side where the leg body 3 comes into contact with the supporting body 2 and a supporting point in a leading end of the leg body 3 in the other end side of the leg body 3 do not exist on the same line as the pressing direction of the supporting body 2.

Effect of the Invention

In the invention of the cushion body 1 described in the first aspect, the polyurethane foam used generally and conventionally can be substituted by the synthetic resin foam, which results in the weight reduction and the improvement in recyclability. Further, in spite of the use of the synthetic resin foam that is relatively hard and inferior in cushioning properties, fitting properties, and creep resistance properties, it is possible to provide the synthetic resin foam with high cushioning properties, high fitting properties, and high degree of freedom of design. The body of the seated person and the supine posture person can be therefore supported appropriately, and the high comfort can be obtained. The favorable creep resistance properties equivalent to those of the conventional polyurethane foam are exerted even with long-time use, thereby exerting the effect of high marketability.

The cushion body 1 described in the second aspect achieves an effect of forming a space which can deforms by bending downward in the supporting body 2 by the leg body 3 since the supporting body 2 is supported by the leg body 3 extended from the supporting body 2, as well as achieving the same effects as those of the invention described in the first aspect.

The cushion body 1 described in the third aspect achieves an effect of forming a space which can deforms by bending downward in the supporting body 2 by the frame 50 since the supporting body 2 is supported by the frame 50, as well as achieving the same effects as those of the invention described in the first aspect.

The cushion body 1 described in the fourth aspect achieves the same effects as those of any one of the first to third aspects 3. Further, in the case that the distance between both ends of the supporting body 2 can not be sufficiently secured by the compact cushion body, and a sufficient deflection can not be obtained by the load caused by the seated person or the supine posture person, it is possible to enlarge the substantial distance between both ends of the supporting body 2 at the bending deformation receiving time and obtain the sufficient deflection, by forming the supporting body 2 into the circular arc shape or the bent shape constructed by the combination of the straight line portions obtained by bending the straight lines at the optional angle, instead of the linear shape. As a result, it is possible to enhance the degree of freedom of the design.

The cushion body 1 described in the fifth aspect achieves the same effects as those of any one of the first to fourth aspects. Further, in the case that the supporting body 2 is constructed by the laminated structure, it is possible to enhance the cushioning properties in the side with which the seated person or the supine posture person comes into contact, by making the supporting body 2 in the seated person side or the supine posture person side with the material having more flexibility. The supporting body 2 can be fitted to an outer shape of the body at the seating time or the supine posture time by conforming the shape of the supporting body 2 in the seated person side or the supine posture side to the shape of the body.

Further, in the case that the supporting body 2 is the integrated structure which is constructed by the combination of the different kinds of materials set every position, for example, in the case that the supporting body 2 has the strongly pressed position and the weakly pressed position applied by the seated person or the supine posture person, the deflection amount of the supporting body 2 can be uniformized over an entire region by using the synthetic resin foam having a higher density at the strongly pressed position of the supporting body 2 and using the synthetic resin foam having a lower density at the weakly pressed position. As a result, it is possible to support the body of the seated person or the supine posture person at a preferable position.

The cushion body 1 described in the sixth aspect achieves the same effects as those of any one of the first to fifth aspects. Further, since the cushion body 1 is structured such that the supporting body 2 supported by the leg body 3 supports the pressure with the reaction force which is generated by the bending deformation in correspondence to the applied pressure, the deflection amount in the center portion is enlarged, for example, in the case of the supporting body 2 having the both-end supported beam shape, however, the cushion body can be structured such that the bending deformation in the center portion is hard to be generated, by making the cross sectional area of the center portion larger than that in the vicinity of both the end portions. As a result, it is possible to average the partial deflection amount of the supporting body 2 and it is possible to obtain the uniform cushioning properties over a whole region of the supporting body 2.

Therefore, there can be achieved an effect that the deflection amount of the supporting body 2 can be adjusted every position by partly changing the width and the thickness in the pressing direction of the surface exposed to the pressure of the supporting body 2 and changing the cross sectional shape and the cross sectional dimension.

The cushion body 1 described in the seventh aspect achieves the same effects as those of any one of the first to sixth aspects. Further, it is possible to enhance the weight reduction and air permeability by the through holes 8.

The cushion body 1 described in the eighth aspect achieves the same effects as those of any one of the first to seventh aspects. Further, since the leading end portion of the projection 15 or the protrusion 16 having the smaller cross sectional area than the supporting body 2 constructing the cushion body 1 first of all comes into contact with the person and deforms by bending when the seated person or the supine posture person comes into contact with the cushion body 1, it is possible to achieve an effect that the seated person feels soft contact feeling when the seated person seats or the supine posture person feels soft contact feeling when the supine posture person is under supine posture.

The cushion body 1 described in the ninth aspect achieves the same effects as those of any one of the first to eighth aspects. Further, in the case that the supporting body 2 and the sub-supporting body 4 are structured such as to be arranged to be separated, the supporting body 2 exposed to the pressure by the seated person or the supine posture person deflects by the bending deformation into the space portion 5, the rear face in the bending direction side of the supporting body 2 comes into contact with the facing sub-supporting body 4 after the certain deflection amount or larger, and the supporting force can be enhanced by the reaction force generated by the deflection of the supporting body 2 and the reaction force generated by the deflection of the sub-supporting body 4 after the contact. As a result, it is possible to inhibit the body from excessively sinking and it is possible to support the body of the seated person or the supine posture person at the appropriate position.

Further, in the case that the supporting body 2 and the sub-supporting body 4 are structured such as to be arranged to be in contact, the supporting force can be enhanced in the range where the sub-supporting body 4 comes into contact with the supporting body 2, in comparison with the range where the sub-supporting body 4 does not come into contact with the supporting body 2. Therefore, the sinking amount generated by the seated person or the supine posture person can be reduced by arranging the sub-supporting body 4 in a contact manner in the range which can be expected to be applied the high pressure by the seated person or the supine posture person.

The cushion body 1 described in the tenth aspect achieves the same effects as those of any one of the first to ninth aspects. Further, since the supporting body 2 is constructed as the multilayer structure such as a two-layer structure and a three-layer structure, for example, in the case of the two-layer structure, the body first of all comes into contact with a first layer, the first layer receives the body softly, the body is pressed further, the deflection amount is enlarged, and the reaction force against the bending deformation of the second layer is added after the contact of the first layer with the second layer. Therefore, it is possible to inhibit the body from sinking and it is possible to stop the body at an appropriate position.

Further, the different hardness and deflection amount can be obtained every positions of the supporting body 2 by changing the shapes and the dimensions of the first layer and the second layer partly.

The cushion body 1 described in the eleventh aspect achieves the same effects as those of any one of the first to tenth aspects. Further, since the leading ends of the projections 15 and the protrusions 16 are structured such as to be separated from the facing surface, the body comes into contact with the surface of the supporting body 2, the supporting body 2 receives the body softly and is further pressed, and the deflection amount is large. Thereafter, the projections 15 and the protrusions 16 come into contact with the facing surface, and the reaction force against the compression deformation of the projections 15 and the protrusions 16 is added. Then, it is possible to inhibit the body from sinking and it is possible to stop the body at the appropriate position.

The cushion body 1 described in the twelfth or thirteenth aspect can achieve the same effects as those of any one of the first to tenth aspects. Further, both ends of the columnar body 18 having the sharp leading end and the columnar body 18 having the smaller density and softer material than the supporting body 2 are structured such as to be fixed its one end side to any one of the supporting body 2 and the rear surface portion 30 and be brought into contact its other end side therewith. As a result, the generated maximum deflection amount can be made equal to or less than the certain amount by arranging the columnar body 18 at the position where the pressure according to the supporting body 2 is higher and the position where the bending deformation is expected to be larger.

The cushion body 1 described in the fourteenth or fifteenth aspect achieves the same effects as those of any one of the first to thirteenth aspects. Further, since the leg body 3 is easily bent, the deflection amount in the vicinity of the leg body 3 can be enlarged. As a result, it is possible to average the deflection amounts of the position where the supporting body 2 comes into contact with the leg body 3 and the position where the supporting body 2 does not come into contact with the leg body 3, and it is possible to obtain the uniform cushioning properties over a whole region of the supporting body 2.

BRIEF DESCRIPTION OF THE DRAWINGS

FIGS. 13A to 13C are explanatory views showing modes in a plane view or a front view of the supporting body, in which FIG. 13A shows a linear shape, FIG. 13B shows a curved shape and FIG. 13C shows a bent shape;

FIGS. 14A and 14B are approximately plane explanatory views of an approximately flat plate-like supporting body in the case of being used in an approximately horizontal state, in which FIG. 14A shows the supporting body structured such that the supporting bodies are partly connected at a plurality of positions, and FIG. 14B shows the supporting body structured such that the supporting bodies are partly connected at a single position;

FIGS. 19A to 19C are cross sectional views of the supporting body, in which FIG. 19A is an explanatory view of a rectangular shape, FIG. 19B is an explanatory view of a circular shape and FIG. 19C is an explanatory view of a pipe shape;

FIGS. 22A to 22C show modes of a sub-supporting body in the cross section along the line B-B in FIG. 2, in which FIG. 22A is an explanatory view of a band-like sub-supporting body which is separated from the supporting body, FIG. 22B is an explanatory view of a coil-like sub-supporting body and FIG. 22C is an explanatory view of a band-like sub-supporting body which is brought into contact with the supporting body;

FIGS. 23A and 23B show a case that the supporting body has a two-layer structure, in which FIG. 23A is a perspective outline view FIG. 23B is an outline view of a cross section along a line W-W in FIG. 23A;

FIGS. 24A to 24C are explanatory views of a case that the supporting body has the two-layer structure, in which FIG. 24A shows a mode that the thickness of the supporting body is changed in the cross section along the line W-W in FIG. 19, FIG. 24B shows a mode that a surface shape of the sub-supporting body is changed in the cross section along the line W-W in FIG. 19, and FIG. 24C shows a mode that a first layer of a cross section along a line X-X in FIG. 19 is integrated and a second layer is separated;

FIGS. 25A and 25B are explanatory views showing modes that projections or protrusions are provided in the cross section along the line B-B in FIG. 2, in which FIG. 25A shows the mode that the projections are provided in a rear face of the supporting body, and FIG. 25B shows the mode that the projections are provided in a space portion side of a rear surface portion, respectively;

FIGS. 26A and 26B are explanatory views showing modes that a columnar body is provided in the cross section along the line B-B in FIG. 2, in which FIG. 26A shows the mode that the columnar body is protruded from the supporting body, and FIG. 26B shows the mode that the columnar body is protruded from the rear surface portion;

FIGS. 27A to 27F are explanatory views showing modes of the leg body in the cross section along the line B-B in FIG. 2, in which FIGS. 27A, 27B and 27C show the modes that the leg body is formed into an inclined shape, FIGS. 27D and 27E show the modes that the leg body is formed into a bent shape, and FIG. 27F shows the mode that the leg body has three or more supporting points;

FIGS. 28A and 28B are views showing a bending test method which is defined in JIS K7171 or ISO178, in which FIG. 28A is a view at the no-load application time, and FIG. 28B is a view at the load application time;

FIGS. 29A to 29C are explanatory views exemplifying modes of the supporting body, and the leg body or a frame, in which FIG. 29A shows the mode that bottom surfaces in both ends of the supporting body are formed into an inclined surface shape, FIG. 29B shows the mode that the supporting body is held from both sides, and FIG. 29C shows the mode that the supporting body has extended positions in both sides;

FIGS. 30A to 30C are explanatory views exemplifying modes of the supporting body, and the leg body or the frame, in which FIG. 30A shows the mode that the bottom surface of the supporting body is supported by a rod-like body, FIG. 30B shows the mode that the bottom surface of the supporting body is supported by a flat plate-like body or the rod-like body, and FIG. 30C shows the mode that convex portions are inserted to concave portions of the supporting body;

FIGS. 31A to 31C are explanatory views exemplifying modes of the supporting body, and the leg body or the frame, in which FIG. 31A shows the mode that both sides of the supporting body are inserted to groove-shaped members, FIG. 31B shows the mode that convex portions in both sides of the supporting body are inserted to the groove-shaped members, and FIG. 31C shows the mode that the convex portions in both sides of the supporting body are interposed from an up-down direction;

FIGS. 32A to 32C are explanatory views exemplifying modes of the supporting body, and the leg body or the frame, in which FIG. 32A shows the mode that convex portions are inserted to concave portions in both sides of the supporting body, FIG. 32B shows the mode that both sides of the supporting body are fixed by a bonding means, and FIG. 32C shows the mode that both sides of the supporting body are fixed by a fastening means;

MODE FOR CARRYING OUT THE INVENTION

Figure 1:
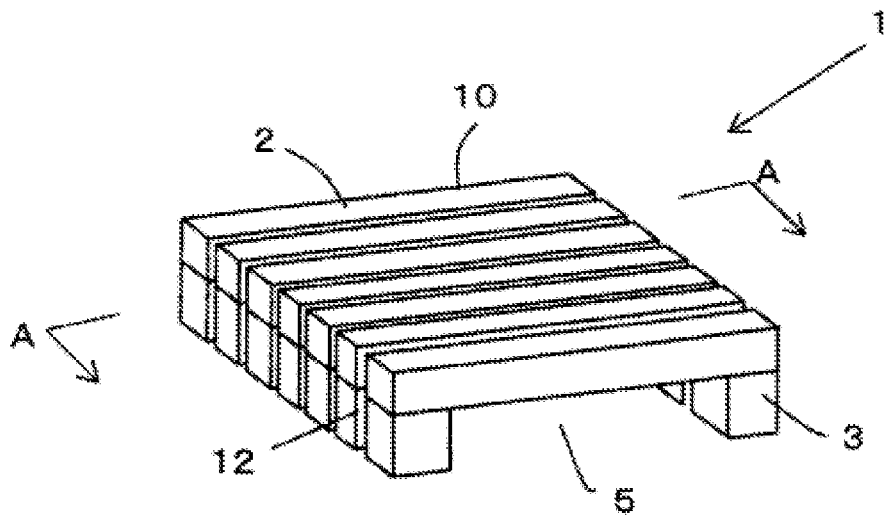
FIG. 1 is an explanatory view of a cushion body having rod-like supporting bodies and leg bodies (in which the supporting bodies and the leg bodies are separated) according to the present invention.

A description will be given below of an embodiment of a cushion body 1 according to the present invention.

The cushion body 1 according to the present invention can be used as a constructing element of a cushion for a vehicular seat of a vehicle, a ship and an airplane, a sofa, a chair, a floor cushion, a bed, a sleeping car, a mattress, an under a futon mattress, a pillow and a mat, which are used at the seating time and the supine posture time of a person.

The cushion body 1 is provided with a plurality of rod-like elements 10 or flat plate-like elements 11 supporting bodies 2 which are constructed by a synthetic resin foam having a bending deflection amount equal to or larger than 20 mm and a load 9 between 2 and 100 N at the 20 mm deflection time, both the bending deflection amount and the load being measured in accordance with a method described in JIS K7221-2: 2006, and the cushion body 1 is structured such that a space portion 5 is formed below the supporting bodies 2 so that the supporting bodies 2 are allowed to be deformed by bending, and a plurality of supporting bodies 2 are lined up in several rows so that they can be deformed by bending, as shown in FIGS. 1 to 6. Further, it is possible to set a bending distortion of the supporting body 2 generated when the supporting body 2 is deformed by bending due to the load applied at the using time of the cushion body 1 within 5%.

Further, the supporting body 2 is mounted or fixed to the leg body 3 or the frame 50 like the modes shown in FIGS. 29 to 32. With regard to the structure between the supporting body 2 and the leg body 3, the supporting body 2 is mounted, fitted or fixed to the leg body 3, or integrally formed with the leg body 3. Further, the fixing mode between the supporting body 2 and the leg body 3 has a mode that the supporting body 2 is supported in a cantilever beam manner, is supported in a both-end supported beam manner, or is supported at a plurality of supporting points equal to or more than three positions, or a mode that the supporting body 2 and the leg body 3 are integrally formed. As a material of the frame 50, metals such as iron, nonferrous metals such as aluminum, resins such as plastics, carbon fibers and woods correspond, and any materials having rigidity may be employed.

Next, with regard to the structure between the supporting body 2 and the frame 50, the supporting body 2 is mounted, fitted or fixed to the frame 50. Further, the fixing mode between the supporting body 2 and the frame 50 has a mode that the supporting body is supported in a cantilever beam manner, is supported in a both-end supported beam manner, or is supported at a plurality of supporting points equal to or more than three positions.

The mode between the supporting body 2, and the leg body 3 or the frame 50 supporting the supporting body 2 has a mode that the leg body 3 or the frame 50 directly comes into contact with the supporting body 2, and a mode that the leg body 3 or the frame 50 is connected to the supporting body 2 via an inclusion. In any case, any modes can be employed as long as the supporting point is constructed when the supporting body 2 is deformed by bending, and are exemplified in FIGS. 29 to 32.

Figure 29A:
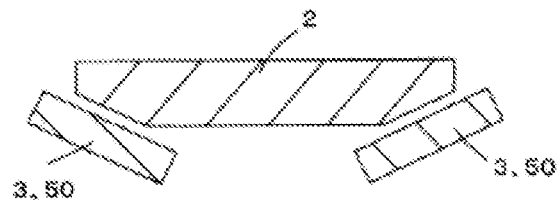
Figure 29B:
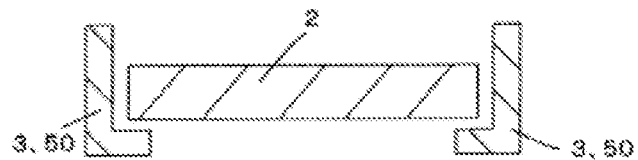
Figure 29C:
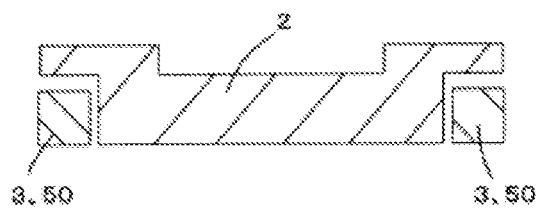
Figure 30A:
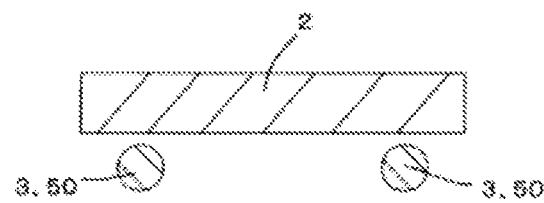
Figure 30B:
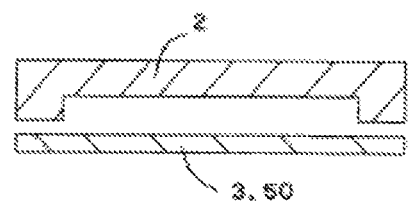
Figure 30C:
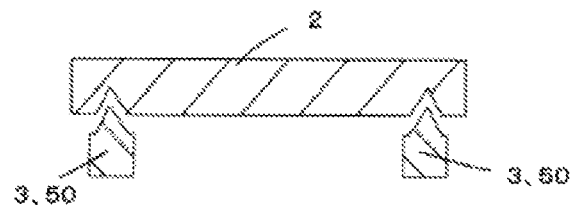

As the mode that the supporting body 2 is supported in its bottom surface, there are exemplified a mode that bottom surfaces in both ends of the supporting body 2 are formed into an inclined surface shape (FIG. 29A), a mode that the supporting body 2 is held from both sides thereof (FIG. 29B), a mode that the supporting body 2 is supported at positions extended to both sides (FIG. 29C), a mode that the bottom surface of the supporting body 2 is supported by rod-like bodies (FIG. 30A), a mode that the bottom surface of the supporting body 2 is supported by flat plate-like bodies or the rod-like bodies (which are different at 90 degrees in their directions from FIG. 30A) (FIG. 30B), and a mode that the supporting body 2 is supported by inserting convex portions to concave portions thereof (FIG. 30C), as shown in FIGS. 29 and 30. The fitting and constraining mode such as the mode of supporting by inserting the concave portions to the convex portions corresponds to the fitting means.

Figure 31A:
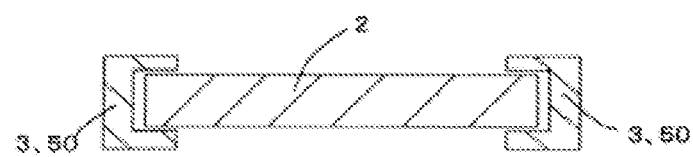
Figure 31B:
Figure 31C:
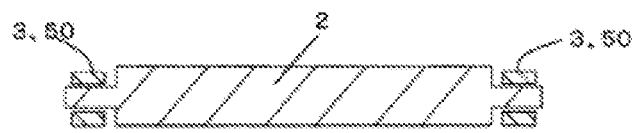
Figure 32A:
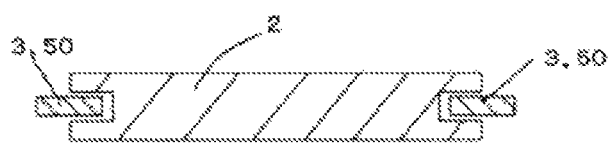
Figure 32B:
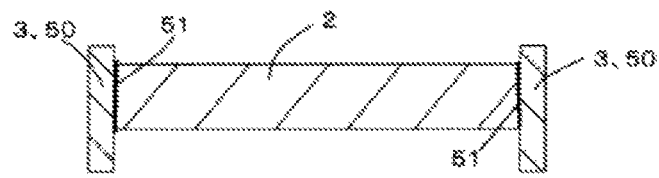
Figure 32C:
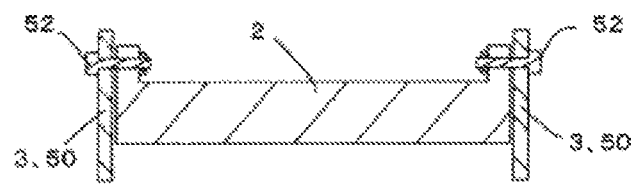

Further, as the mode that the supporting body 2 is supported in its both sides, there are exemplified a mode that both sides of the supporting body 2 is inserted to groove-like members (FIG. 31A), a mode that convex portions in both sides of the supporting body 2 are inserted to the groove-like members (FIG. 31B), a mode that convex portions in both sides of the supporting body 2 are interposed from an up-down direction (FIG. 31C), a mode that convex portions are inserted to concave portions in both sides of the supporting body 2 (FIG. 32A), a mode that both sides of the supporting body 2 are fixed by bonding means (FIG. 32B), and a mode that both sides of the supporting body 2 are fixed by fastening means (FIG. 32C), as shown in FIG. 31 or 32.

Figure 2:
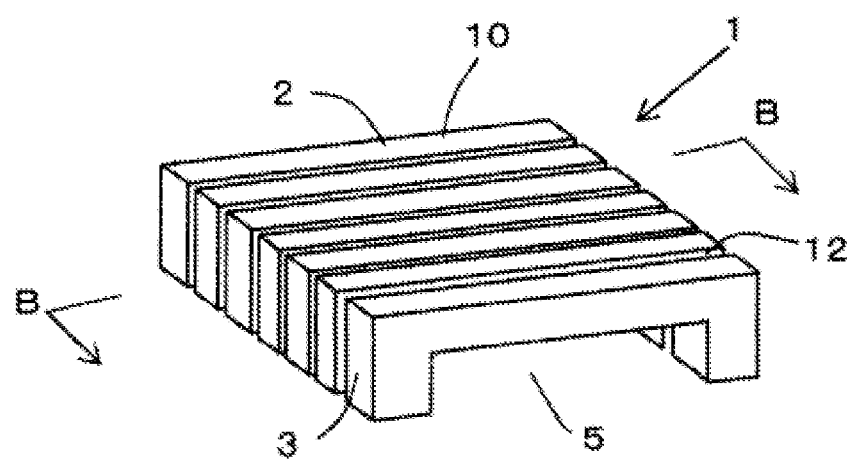
FIG. 2 is an explanatory view of a cushion body having rod-like supporting bodies and leg bodies (which are integrally formed)
Figure 10:
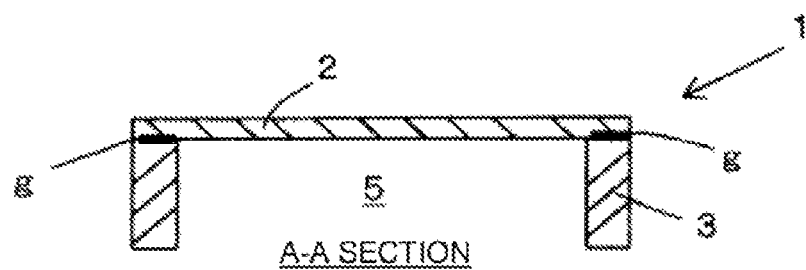
FIG. 10 is an explanatory view of the cushion body in which the supporting bodies and the leg bodies are fixedly provided, in the cross section along the line A-A in FIG. 1.

The mode that the supporting body 2 is mounted to the leg body 3 means a state in which the supporting body 2 and the leg body 3 are not fixed in a boundary g thereof in FIG. 10. Further, in the lined-up in several rows mode so that they can deform, a plurality of rod-like elements 10 or a plurality of flat plate-like elements 11 may be in contact with each other as long as the supporting bodies 2 constructed by a plurality of rod-like elements 10 or a plurality of flat plate-like elements 11 can deform by bending without mutual interference. For example, intervals 12 may be provided as shown in FIG. 2.

Figure 9:
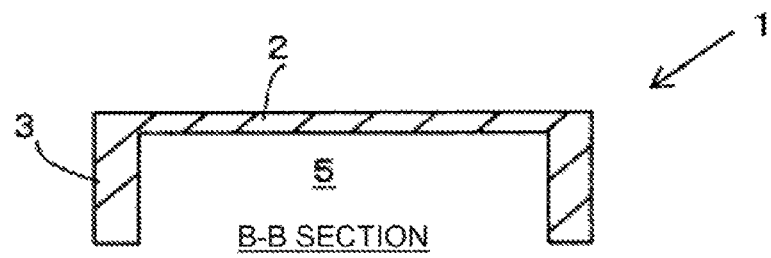
FIG. 9 is an explanatory view of the cushion body in which the supporting bodies and the leg bodies are integrally formed, in the cross section along the line B-B in FIG. 2.
Figure 11:
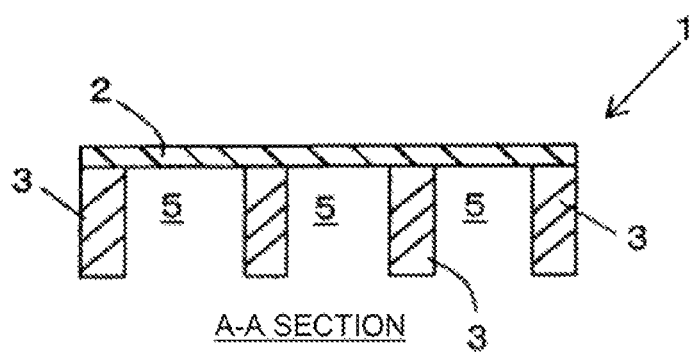
FIG. 11 is an explanatory view of a mode that a plurality of leg bodies are provided, in the cross section along the line A-A in FIG. 1.
Figure 12:
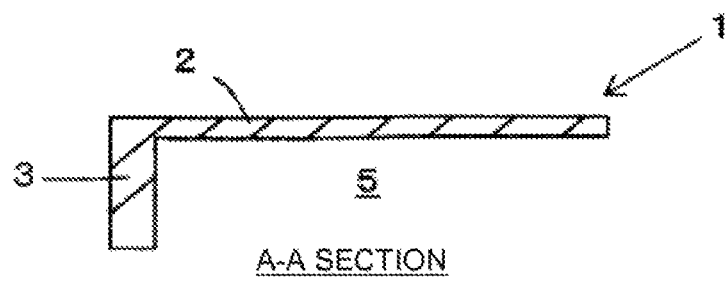
FIG. 12 is an explanatory view of a mode that the supporting body is a cantilever beam, in the cross section along the line A-A in FIG. 1.

Further, as the fixing mode between the supporting body 2 and the leg body 3, there are a mode that the supporting body 2 is supported in the cantilever beam manner as shown in FIG. 12, a mode that the supporting body 2 is supported in the both-end supported beam manner as shown in FIG. 10, and a mode that the supporting body 2 is supported at a plurality of points equal to or more than three positions as shown in FIG. 11. Further, there is a mode that the supporting body 2 and the leg body 3 are integrally formed as shown in FIG. 9. Further, although an illustration is omitted, there are modes that respective fixing positions are integrally formed under the mode that the supporting body 2 is supported in the cantilever beam manner as shown in FIG. 12, the mode that the supporting body 2 is supported in the both-end supported beam manner as shown in FIG. 10, and the mode that the supporting body 2 is supported at a plurality of points equal to or more than three positions as shown in FIG. 11. Further, as a method of fixing the supporting body 2 and the leg body 3, there are a method of integrally forming the supporting body 2 and the leg body 3 as shown in FIG. 9, a method of fixing the boundary g between the supporting body 2 and the leg body 3 with an adhesive agent as shown in FIG. 10, and a method of fixing with bolts and nuts.

The cushion body 1 according to the present invention intends to obtain the cushioning properties on the basis of the bending deformation of the supporting body 2 instead of the compression deformation like the polyurethane, since the synthetic resin foam is used as the material of the supporting body 2 according to the present invention. Therefore, it is necessary to form a space portion 5 in a rear side of the supporting body 2. Since the supporting body 2 constructed by the synthetic resin foam deforms by bending and deflects to the space portion 5 side on the basis of the pressing at the seating time or the supine posture time of the person, the cushion body 1 according to the present invention can make the seated person or the supine posture person feel the high comfortable sit feeling and the high comfortable sleep feeling. Further, the space portion 5 may be filled with a material which does not inhibit the bending deformation of the supporting body 2 as a filling material, for example, a fiber material may be filled as the filling material.

Figure 7:
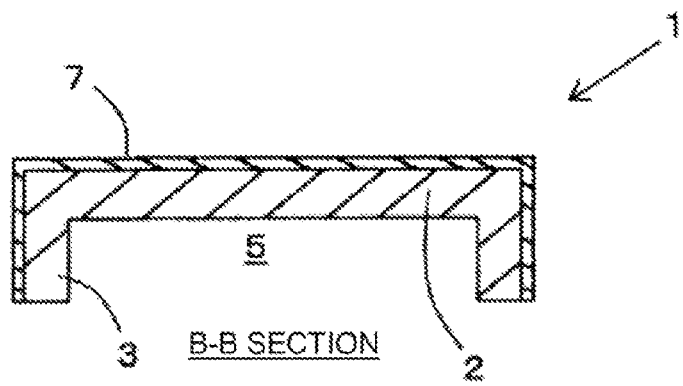
FIG. 7 is an explanatory view of the cushion body having a vehicle seat cover in a cross section along a line B-B in FIG. 2.

Further, the cushion body 1 may be structured such that the space portion 5 is provided with a sub-supporting body 4. Further, in the case that the cushion body 1 is used for a vehicular seat or a bed, an outer peripheral surface of the cushion body 1 is covered with a surface cover 7, as shown in FIG. 7.

Further, a magnitude, a cross sectional shape and a distance between the supporting points of the supporting body 2 are set so that the bending distortion generated in the supporting body 2 due to the load applied when the cushion body 1 is used is confined to 5%.

The cushion body 1 is required to be used in an elastic range of the synthetic resin foam against the repetition loads over the long term. However, any clear yield point does not appear in spite of tension or compression waveform and the plastic deformation is applied little by little in the elastic range of the synthetic resin foam, it is difficult to accurately determine the elastic range. The inventors of the present invention have found by repeating trials that the durability restoration properties required in the cushion body 1 which is generally used plural times can be satisfied by confining the bending distortion generated when the load is applied to 5%. It is possible to achieve an effect that the durability restoration properties can be satisfied in relation to the load applied over the long term or repeatedly, by confining the bending distortion generated in the cushion body 1 to 5%.

The load applied when the cushion body 1 is used means the load which is generally considered when the cushion body 1 is used for various intended uses or under various modes. For example, since the weight per one occupant used for calculating total weight of the vehicle defined in JIS D0001-2001 is 55 kg, 55 kg is set in the passenger car, the magnitude, the cross sectional shape and the distance between the supporting points of the supporting body 2 are set. The load is set in correspondence to the vehicular seats for the ships and airplanes, the sofas, the chairs, the floor cushions, the beds, the sleeping cars, the mattresses, the under a futon mattresses, the pillows and the mats which are the other intended uses of the cushion body 1.

Figure 28A:
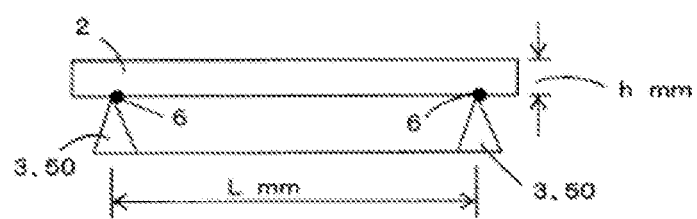
Figure 28B:
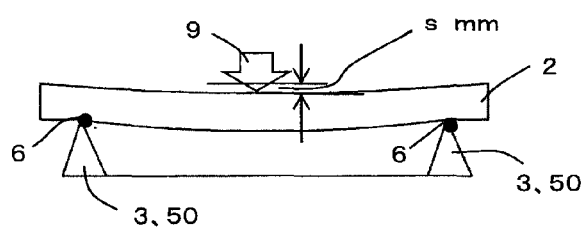

The bending distortion can be determined by JIS K7171 or ISO178 which is a standard of a hard or semi-hard plastic bending test method. First of all, a dummy corresponding to a user and having a load applied in a used state is seated or supine postured at a normal position of the cushion body 1 which is a test body, and the load applied to each of sections of the cushion body 1 is measured. The load applied to the supporting body 2 in each of the corresponding sections is determined on the basis of the results. The bending distortion is thereafter determined by measuring a deflection amount generated by applying the determined load to an experimental sample having the same shape and supporting mode as those of the corresponding portion, and substituting it into the calculation expression (Expression 1) defined in JIS K7171 together with a supporting point distance of the supporting body 2 and a thickness of the supporting body 2. A typified bending test method is shown in FIG. 28. FIG. 28A shows a no-load time, and FIG. 28B shows generation of s mm deflection when the load is applied. Further, the bending distortion is calculated from the following relational expression (Expression 1).

$$\text{Bending distortion } \varepsilon(\%) = 600sh/L^2 \quad \text{(Expression 1)}$$

in which s is deflection (mm), h is thickness (mm) of the test specimen (the supporting body 3) and L is distance between supporting points (distance between supporting points supporting the supporting bodies) (mm). The contact point portions between the supporting body 2 and the leg body 3 or the frame 50 supporting the supporting body 2 at both ends correspond to the supporting points 6.

Any clear yield point does not appear in spite of the tension or the compression waveform and the plastic deformation is applied little by little in the elastic range of the synthetic resin foam, generally, it is difficult to accurately determine the elastic range.

The inventors of the present invention have found by repeating trials that the durability restoration properties required in the cushion body 1 which is generally used plural times can be satisfied by confining the bending distortion generated when the load is applied to 5%.

Further preferably, a rate between the distance L between supporting points of the cushion body 1 and the thickness h of the cushion body, that is, a value of L/h is preferably between 4 and 40, in accordance with the expression (Expression 1) determining the bending distortion. In the case that the rate of L/h is below 4, the deflection s generated by the bending deformation of the cushion body 1 is extremely small in relation to the thickness h of the cushion body 1. As a result, a sufficient deformation stroke which is generally required as the cushion body can not be obtained and the cushion body lacks marketability. On the contrary, in the case that the rate of L/h goes beyond 40, the bending deflection greater than the thickness h of the cushion body can be obtained, however, the load supportable in the deformation range is extremely small, and the cushion body lacks marketability as well as enlargement of the cushion body.

Next, a description will be given of constructing elements of the supporting body 2, the leg body 3 and the sub-supporting body 4. The cushion body 1 according to the present invention can be constructed by combination selected from the leg body 3, the frame 50, the sub-supporting body 4, the projection 15, the protrusion 16, the columnar body 18, the supporting body 2 having the structure which is made of different kinds of materials every positions, the supporting body 2 provided with through holes, the supporting body 2 constructed by multilayer structure, and various kinds of leg bodies 3, while having the supporting body 2 described below as a basic constructing element.

Figure 3:
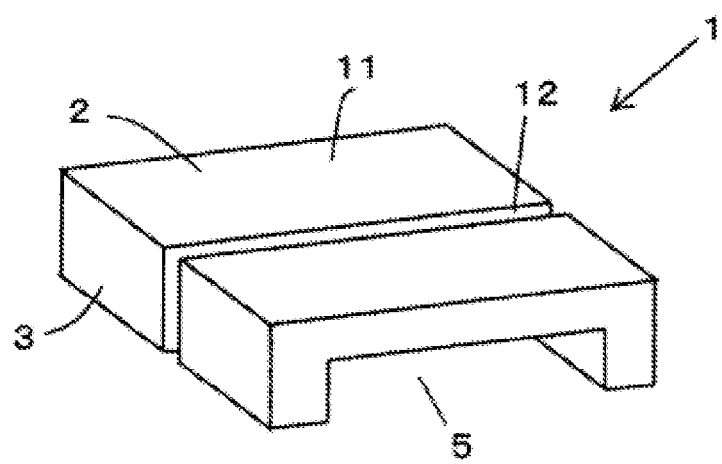
FIG. 3 is an explanatory view of a cushion body having flat plate-like supporting bodies and leg bodies (which are integrally formed) according to the present invention.
Figure 4:
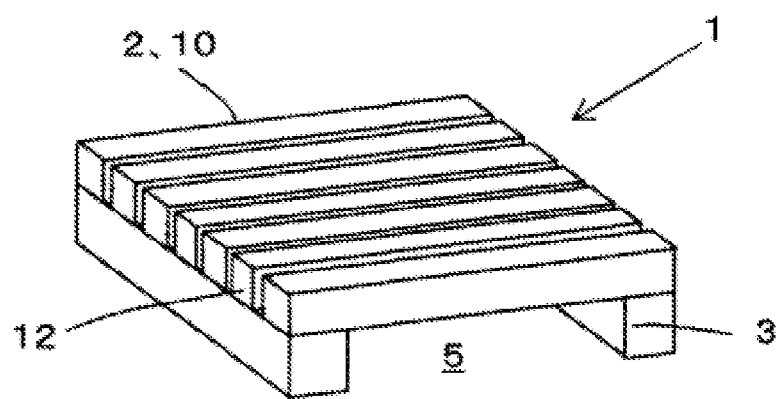
FIG. 4 is an explanatory view of a cushion body having rod-like supporting bodies and leg bodies (in which the supporting bodies and the leg bodies are separated) according to the present invention.
Figure 5:
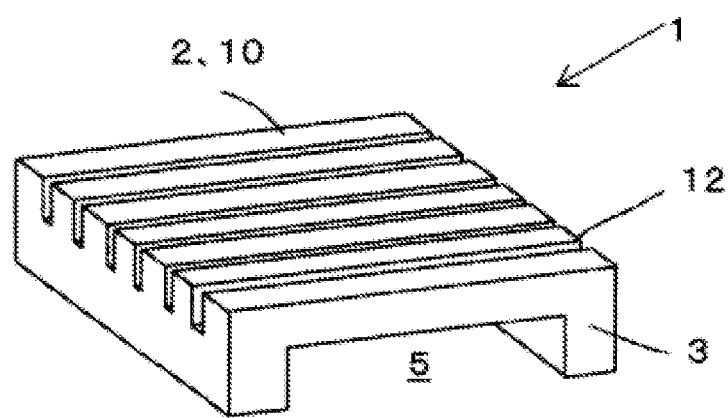
FIG. 5 is an explanatory view of a cushion body having rod-like supporting bodies and leg bodies (which are integrally formed) according to the present invention.
Figure 6:
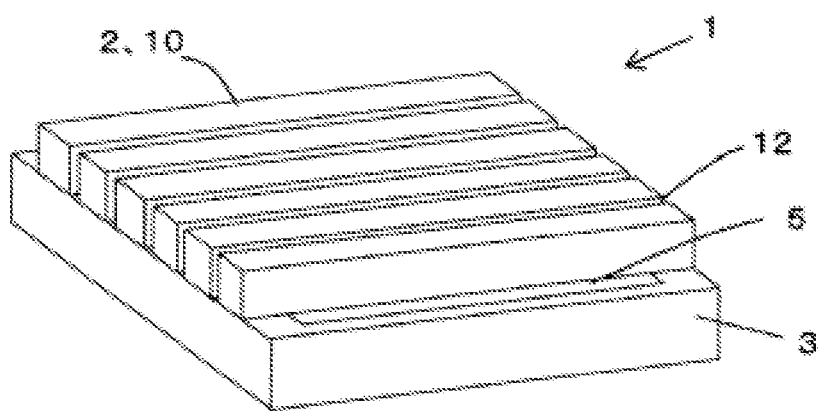
FIG. 6 is an explanatory view of a cushion body having rod-like supporting bodies and a leg body (in which the supporting bodies and the leg body are separated) according to the present invention.
Figure 8:
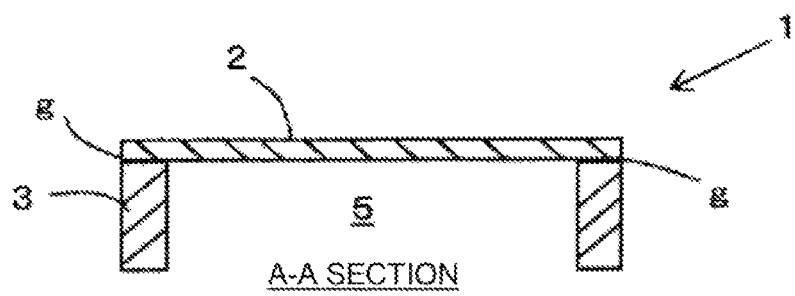
FIG. 8 is an explanatory view of the cushion body in which the supporting bodies are mounted to the leg bodies, in a cross section along a line A-A in FIG. 1.

First of all, a description will be given of the supporting body 2. The supporting body 2 is made of the synthetic resin foam, deforms by bending to the space portion 5 side by the load 9 due to the seating or the supine posture of the person and generates the deflection. As the mode of the supporting body 2, there are a mode of a plurality of flat plate-like elements 11 as shown in FIG. 3, and a mode of a plurality of rod-like elements 10 as shown in FIGS. 1, 2 and 4 to 6. The structure between the supporting body 2 and the leg body 3 has a mode that both end portions of the supporting body 2 are mounted to the upper end portion of the leg body 3 as shown in FIG. 8, a mode that the supporting body 2 and the leg body 3 are independent and are fixed as shown in FIG. 10, and a mode that the supporting body 2 and the leg body 3 are integrally molded as shown in FIG. 9.

Further, the fixing structure between the supporting body 2 of a plurality of flat plate-like elements 11 or the supporting body 2 of a plurality of rod-like elements 10 and the leg body 3 has the cantilever beam mode as shown in FIG. 12 or the both-end supported beam mode as shown in FIG. 10, in relation to the leg bodies 3 arranged in both ends of the supporting body 2, or the mode that the supporting body 2 is supported at a plurality of points equal to or more than three positions between both ends thereof as shown in FIG. 11.

Figure 13A:
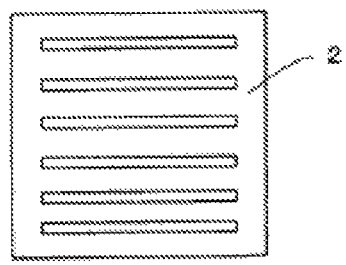
Figure 13B:
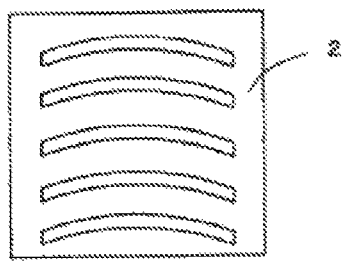
Figure 13C:
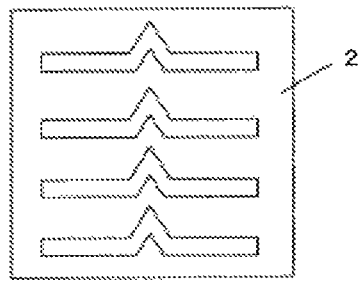
Figure 14A:
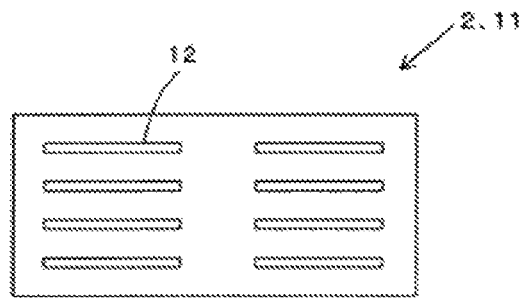
Figure 14B:
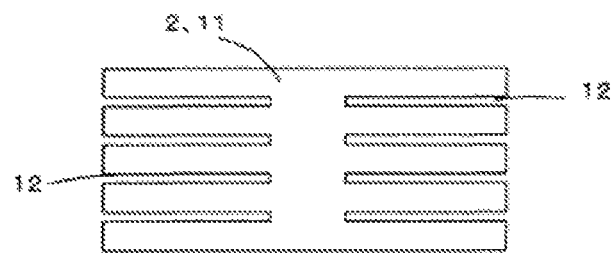

Next, as a shape of the supporting body 2 of a plurality of rod-like elements 10 or a plurality of flat plate-like elements 11, there are shapes constructed by combination of at least one of a linear shape as shown in FIG. 13A, a curved shape as shown in FIG. 13B, a bent shape constructed by combination of straight line portions obtained by bending straight lines at optional angles as shown in FIG. 13C, a shape partly connecting a plurality of supporting bodies 2 lined up with intervals 12 to each other at a plurality positions as shown in FIG. 14A, and a shape partly connecting a plurality of supporting bodies 2 lined up with intervals 12 to each other at a single position as shown in FIG. 14B, in a plane view in the case that the surface coming into contact with the seated person or the supine posture person is an approximately horizontal surface, or in a front view in the case that the surface coming into contact with the seated person is an approximately vertical surface.

The position of the supporting body 2 can be adapted to the position to be brought into contact with the seated person or the supine posture person by setting the shape of the supporting body 2 to the mode constructed by at least one shape of the linear shape, the curved shape and the bent shape, and the deflection amount can be changed every position of the cushion body 1 by the shape.

Next, the structure of the supporting body 2 can be set to a laminated structure constructed by a plurality of supporting bodies 2 made of different materials or a plurality of supporting bodies 2 made of the same material, or a structure obtained by combining and integrating constructing portions made of different kinds of materials every position.

Figure 15:
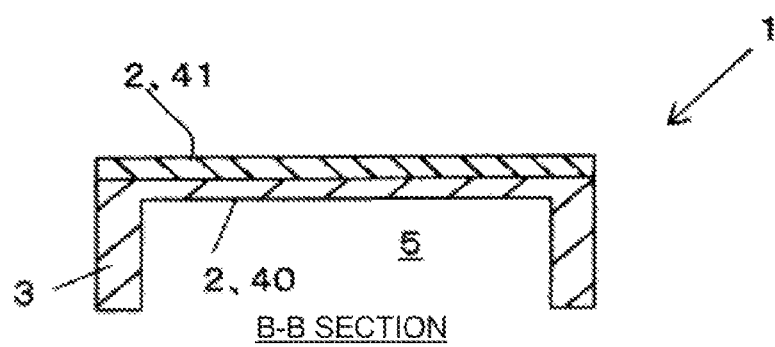
FIG. 15 is an explanatory view of a laminated structure in which the supporting bodies are made of different kinds of materials, in the cross section along the line B-B in FIG. 2.

In the case that the structure of the supporting body 2 is set to the laminated structure, the supporting body 2 is obtained by fixing and laminating the supporting bodies 2 made of the same material or different materials by an adhesive agent. For example, the laminated structure made of the different materials is the supporting body 2 which is obtained by laminating layers made of two different kinds of materials a40 and b41 having different hardness and different density and is constructed by two layers, in a pressing direction to the seated person or the supine posture person as shown in FIG. 15, and the deflection amount of the supporting body 2 can be adjusted in correspondence to the combination of the materials.

Figure 16:
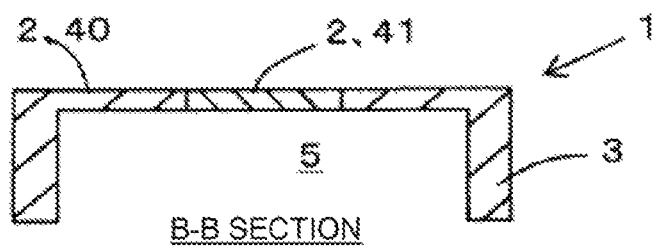
FIG. 16 is an explanatory view of a structure in which the supporting bodies are constructed by different kinds of materials every positions and integrated, in the cross section along the line B-B in FIG. 2.

Further, in the case that the structure is set to the integrated structure constructed by the combination of the different kinds of materials set every position, the supporting body 2 is constructed by two kinds of materials a40 and b41 having different hardness and different density every position of the supporting body 2, for example, as shown in FIG. 16, and the deflection amount of the supporting body 2 can be adjusted every position in correspondence to the combination of the materials.

Figure 19A:
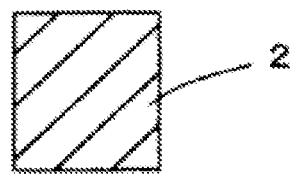
Figure 19B:
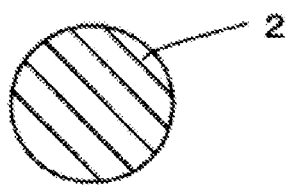
Figure 19C:
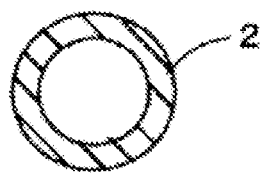

In the case of the supporting body 2 of the rod-like elements 10, a cross sectional shape can be set optionally to a rectangular shape as shown in FIG. 19A, a circular shape as shown in FIG. 19B, a polygonal shape, a trapezoidal shape, an oval shape, and a pipe shape as shown in FIG. 19C. Since the deflection amount changes in accordance with the cross sectional shape, the deflection amount of the supporting body 2 can be changed by selecting the cross sectional shape.

The supporting body 2 of a plurality of flat plate-like elements 11 or the supporting body 2 of a plurality of rod-like elements 10 can change magnitude of reaction force generated together with the bending deformation by changing a dimension of shape, width and thickness of a cross section in the pressing direction of the seated person or the supine posture person. The rigidity against the bending deformation can be express by section modulus, however, the section modulus changes in correspondence to the change of cross sectional shape of the supporting body 2 to a rectangular shape, a square shape, a circular shape and a pipe shape, and the wider the supporting body 2 is, the stronger the supporting body 2 is against the bending and the supporting body is hard to be deformed by bending. Further, the narrower the supporting body 2 is, the weaker the supporting body 2 is against the bending and the supporting body is easily deformed by bending. The thicker the supporting body 2 is, the stronger the supporting body 2 is against the bending and the supporting body 2 is hard to be deformed by bending. The thinner the supporting body 2 is, the weaker the supporting body 2 is against the bending and the supporting body is easily deformed by bending.

Figure 17:
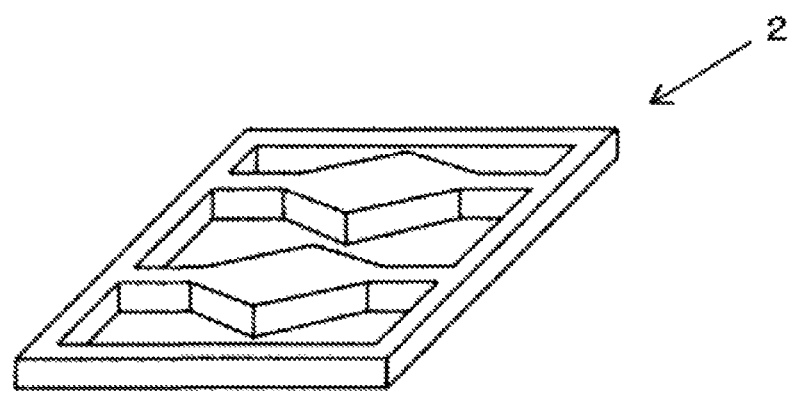
FIG. 17 is an explanatory perspective view of a mode that the width of the supporting body is changed in correspondence to the positions.
Figure 18:
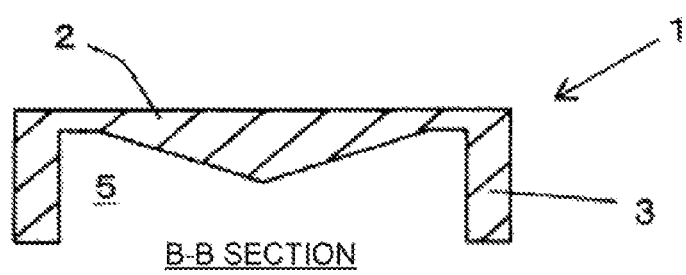
FIG. 18 is an explanatory view of a mode that the thickness of the supporting body is changed in correspondence to the positions, in the cross section along the line B-B in FIG. 2.

Therefore, the deflection amount can be adjusted in accordance with the cross sectional shape of the supporting body 2 and the magnitude of the cross section such as the width and the thickness. For example, the supporting body 2 is hard to be deflected by making the width of the supporting body 2 corresponding to the position having the high pressing force applied by the seated person or the supine posture person larger as shown in FIG. 17, and it is possible to optimize the sinking position of the seated person and the supine posture person by adjusting the deflection amount. Further, the supporting body 2 is hard to be deflected by making the thickness in the pressing direction of the supporting body 2 corresponding to the position having the high pressing force applied by the seated person or the supine posture person larger as shown in FIG. 18, and it is possible to optimize the sinking position of the seated person and the supine posture person by adjusting the deflection amount.

Figure 20:
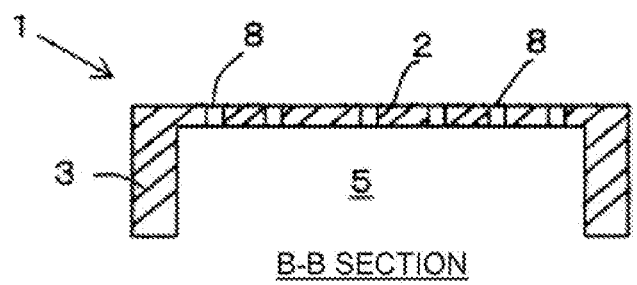
FIG. 20 is a cross sectional view along the line B-B in FIG. 2 in which through holes are provided in the supporting body, and is an explanatory view of the through holes provided in a pressing direction.

Next, through holes 8 may be provided in a front-rear direction, a right-left direction or an up-down direction in the supporting body 2 of a plurality of rod-like elements 10 or a plurality of flat plate-like elements 11 as shown in FIG. 20. It is possible to enhance the weight reduction of the cushion body 1 and the air permeability of the cushion body 1 by the provision of the through holes 8.

Figure 21:
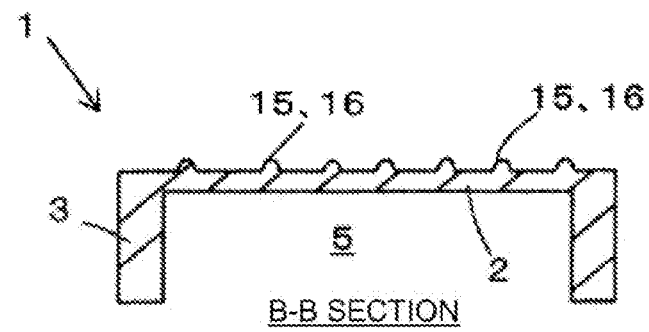
FIG. 21 is an explanatory view of projections provided on a surface of the supporting body, in the cross section along the line B-B in FIG. 2.

Further, projections 15 or protrusions 16 may be provided on a surface of the supporting body 2 of a plurality of rod-like elements 10 or a plurality of flat plate-like elements 11, the surface with which the person is in contact, as shown in FIG. 21. A mode of the projection 15 may employ a columnar shape such as a cylindrical shape and a polygonal column shape with flat, concave or convex leading end shape, and a mode of the protrusion 16 may be structured such that a plurality of elongated linear or curved protrusions are arranged on the surface of the supporting body 2 at least one direction of vertical, lateral and diagonal directions, and a cross sectional shape of the protrusion 16 may be formed into an optional shape such as a rectangular shape, a trapezoidal shape or a wavy shape as long as the shape is compressed and deformed by bending due to the pressing force of the seated person or the supine posture person. There can be achieved by the projection 15 or the protrusion 16 an effect that the seated person or the supine posture person can feed a soft contact feeling when coming into contact with the cushion body 1.

Figure 25A:
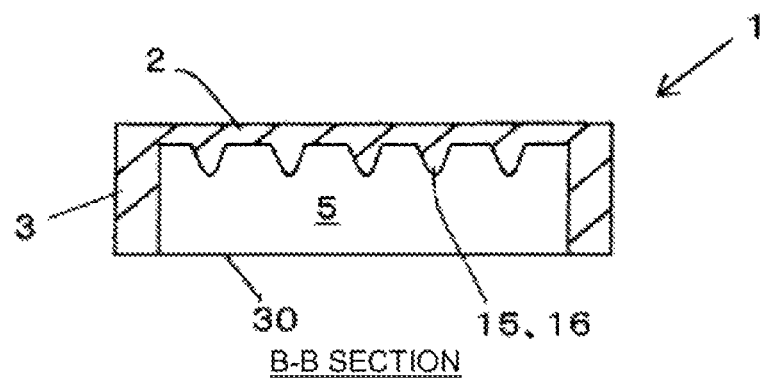
Figure 25B:
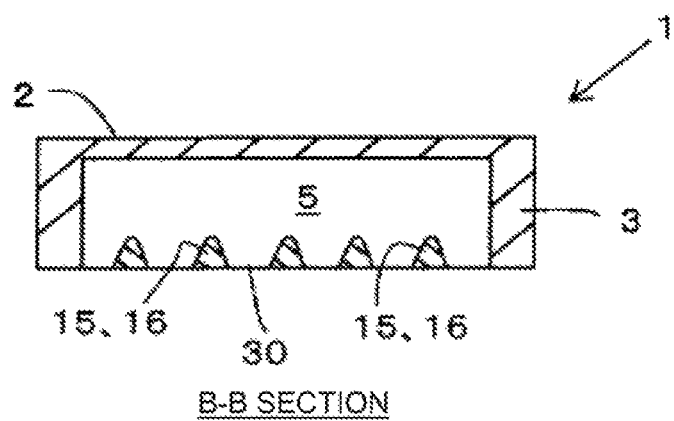

Next, the projections 15 and/or the protrusions 16 may be provided in a protruding manner on a rear face of the supporting body 2 of a plurality of rod-like elements 10 or a plurality of flat plate-like elements 11 as shown in FIG. 25A, or a surface in the supporting body 2 side of the rear surface portion 30 facing to the supporting body 2 as shown in FIG. 25B, in such a manner as to be separated from the rear surface portion 30 or the rear face of the supporting body 2 to which leading end portions of the projections 15 and/or the protrusions 16 face.

Since the body comes into contact with the surface of the supporting body 2, the supporting body 2 softly receives the body and is further pressed, the deflection amount is enlarged, the projections 15 or the protrusions 16 thereafter come into contact with the facing surface, and the reaction force against the compression deformation of the projections 15 or the protrusions 16 is applied, it is possible to inhibit the body from sinking so as to stop the body at an appropriate position.

Next, a description will be given of the leg body 3.

The leg body 3 has a shape which is bent at a single time or plural times on a line connecting the supporting point 6 in one end side coming into contact with the supporting body 2 and the supporting point 6 of the leading end of the leg body 3 in the other end side. Further, the leg body is pressed and stopped its one end in the supporting body side by the supporting body, and is inhibited its other end from moving in a pressing direction generated by the seated person or the supine posture person, and the leg body is obtained by independently or continuously arranging the leg body 3 formed into an approximately single linear shape structured such that a supporting point in one end side where the leg body comes into contact with the supporting body and a supporting point in a leading end of the leg body in the other end side of the leg body do not exist on the same line as the pressing direction of the supporting body.

The line connecting the supporting point 6 in the one end side coming into contact with the supporting body 2 and the supporting point 6 of the leading end of the leg body 3 in the other end side of the leg body 3 means one line connecting from the supporting point 6 in the one end side coming into contact with the supporting body 2 to the supporting point 6 in the other end side coming into contact, for example, with the rear surface portion 30 in the pressing direction of the leg body 3. For example, the line means a line connecting the supporting point 6 in the one end side coming into contact with the supporting body 2 in the leg body 3 and the supporting point 6 in the other end side in FIG. 27A.

The leg body 3 constructed by the approximately single linear shape means one leg body 3 from the supporting point 6 in the one end side coming into contact with the supporting body 2 to the supporting point 6 in the other end side coming into contact, for example, with the rear surface portion 30 in the pressing direction. Further, the singly arranged leg body 3 means a mode of the leg body 3, for example, as shown in FIG. 27A, and the continuously arranged leg body 3 means a mode of the leg body 3, for example, as shown in FIG. 27F.

Figure 27A:
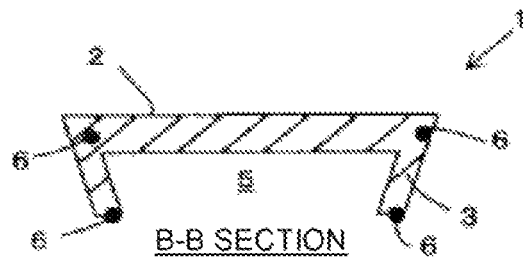
Figure 27B:
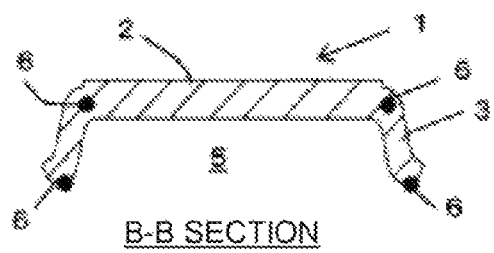
Figure 27C:
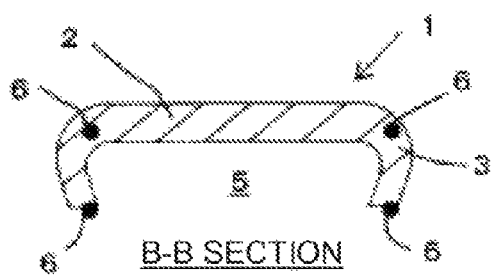
Figure 27D:
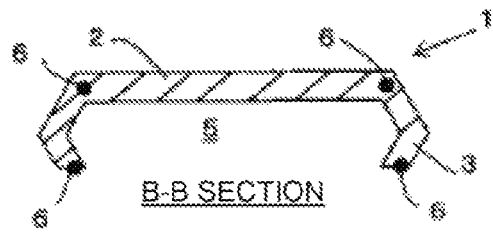
Figure 27E:
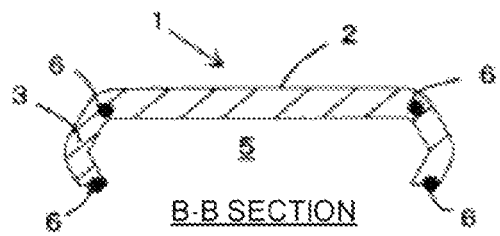
Figure 27F:
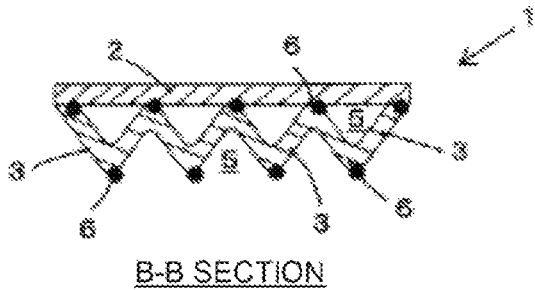

The specific modes of the leg body 3 have a mode of the same linear shape as shown in FIG. 1 in relation to the pressing direction by the seated person or the supine posture person, a mode of an inclined shape as shown in FIG. 27A, 27B or 27C, a mode of a bent shape as shown in FIG. 27D or 27E, a mode of an approximately wavy shape which can be supported at a multiple points to the supporting body 2 as shown in FIG. 27F, and a mode that projections having a bowl shape which is formed into an approximately U-shaped form in its cross section are arranged (not shown).

The leg body 3 is made of a material having rigidity such as plate or frame in the case that the leg body 3 is not deformed by the pressing force, and is made of an elastic body such as the synthetic resin foam, the rubber, the spring or the plastics having flexibility in the case that the leg body 3 is deformed by the pressing force.

The position away from the leg body 3 tends to be comparatively larger in the deflection amount and the position near the leg body 3 tends to be comparatively smaller in the deflection amount, however, it is possible to enlarge the deflection amount near the supporting point portion between the supporting body 2 and the leg body 3 in the case that the material of the leg body 3 is an easily bending mode. As a result, it is possible to average the deflection amounts at the position near the leg body 3 in the supporting body 2 and the position away from the leg body 3, and it is possible to obtain the uniform cushioning properties over a whole region of the supporting body 2.

Figure 26A:
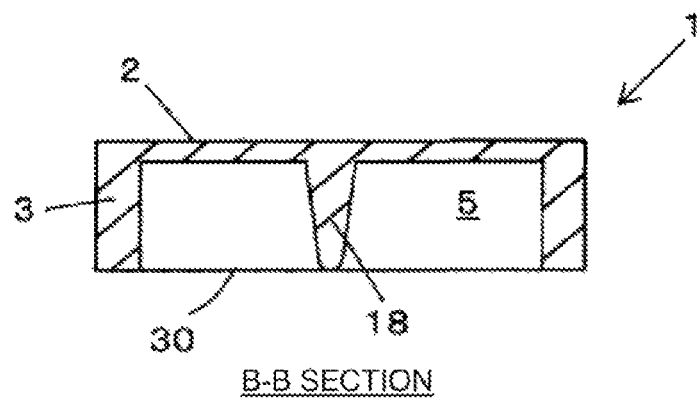
Figure 26B:
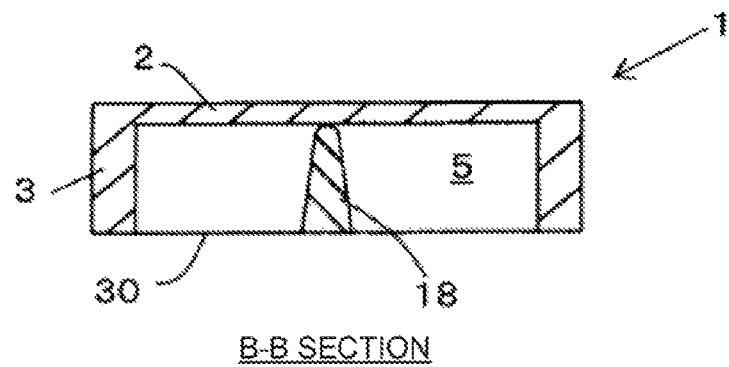

Next, a description will be given of the columnar body 18. The columnar body 18 has a mode that the columnar body 18 is interposed between the supporting body 2 and the rear surface portion 30, and as a mode that a leading end portion of the columnar body 18 is brought into contact with the facing rear surface portion 30 and is provided in a protruding manner on the rear face of the supporting body 2 of a plurality of rod-like elements 10 or a plurality of flat plate-like elements 11 as shown in FIG. 26A, and a mode that the leading end portion of the columnar body 18 is brought into contact with the rear face of the facing supporting body 2 and is provided in a protruding manner on the surface in the supporting body 2 side of the rear surface portion 30 facing to the supporting body 2.

The columnar body 18 is constructed by a mode that a cross sectional area of the leading end portion is made smaller than that of a root portion, and/or a material having a density which is smaller than a density of the synthetic resin foam which is the material of the supporting body 2.

The maximum deflection amount generated in the supporting body 2 can be made equal to or less than a certain amount by interposing the columnar body 18 between the supporting body 2 and the rear surface portion 30 at the position which is comparatively largely deformed by bending due to the pressing force of the seated person or the supine posture person, and fixing the columnar body 18 to the supporting body 2 or the rear surface portion 30.

Further, it is possible to feel the softness of the cushion body when the seated person seats or the supine posture person is supine postured, by making the cross sectional area of the leading end portion of the columnar body 18 smaller than that of the root, and making the material of the columnar body 18 softer than that of the supporting body 2.

Next, a description will be given of the multilayer structure of the supporting body 2.

Figure 23A:
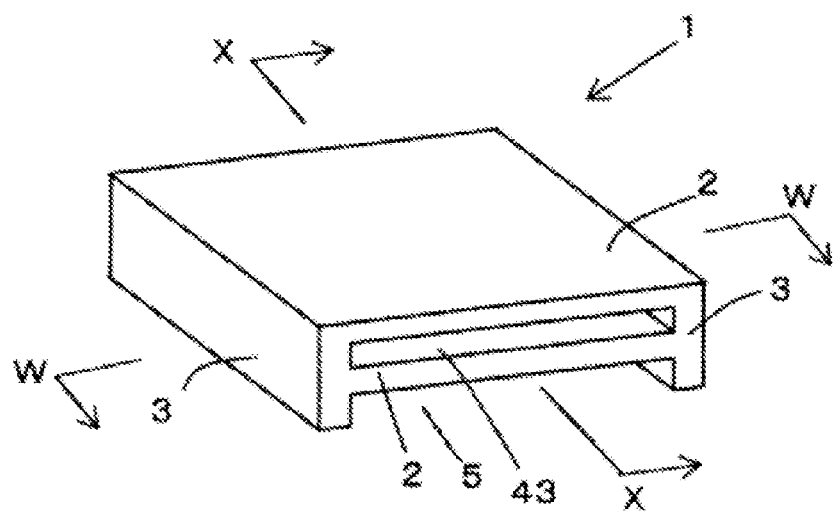
Figure 23B:
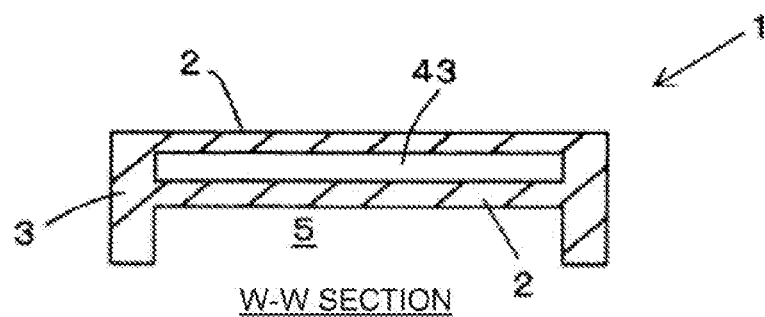

In the multilayer structure of the supporting body 2, the supporting body 2 is formed as a multilayer structure such as two layers or three layers by the provision of a gap 43 between the layers in relation to the pressing direction by the seated person or the supine posture person, as shown in FIGS. 23A and 23B.

In the case that the supporting body 2 has the one-layer structure, the magnitudes of the thickness and the width of the supporting body 2 are set so as to support the pressing force of the seated person or the supine posture person. It is possible to inhibit the body from sinking and stop the body at an appropriate position by setting the supporting body 2 to the multilayer structure which is equal to or more than two layers. For example, in the case of the two-layer structure, the body first of all comes into contact with the first layer, the first layer softly receives the body, and is further pressed, the deflection amount is enlarged, the first layer comes into contact with the second layer, and the reaction force against the bending deformation of the second layer is thereafter applied.

Figure 24A:
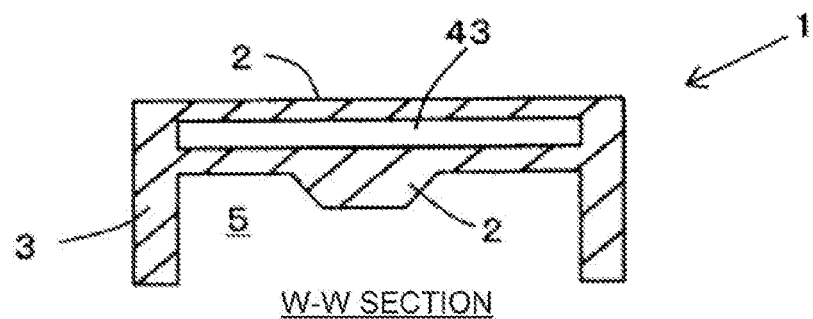

Further, for example, in the case that the thickness of the supporting body 2 in the first layer is uniform, and the center portion of the supporting body 2 in the second layer is thickened in the pressing direction as shown in FIG. 24A, the center portion of the supporting body 2 is hard to deform. It is possible to inhibit the seated person or the supine posture person from sinking at the seating time or the supine posture time by the provision of the structure mentioned above at a position which is strongly pressed by the seated person or the supine posture person.

Figure 24B:
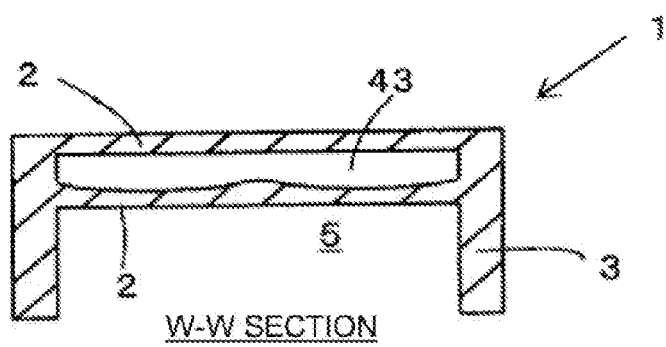

Further, for example, in the case that the thickness of the supporting body 2 in the first layer is uniform, and the surface in the seated person side or the supine posture person side of the supporting body 2 in the second layer is formed so as to confine to the outer shape of the body of the seated person or the supine posture person as shown in FIG. 24B, it is possible to obtain the cushion body which fits to the outer shape of the body when the seated person or the supine posture person seats or be supine postured completely.

Figure 24C:
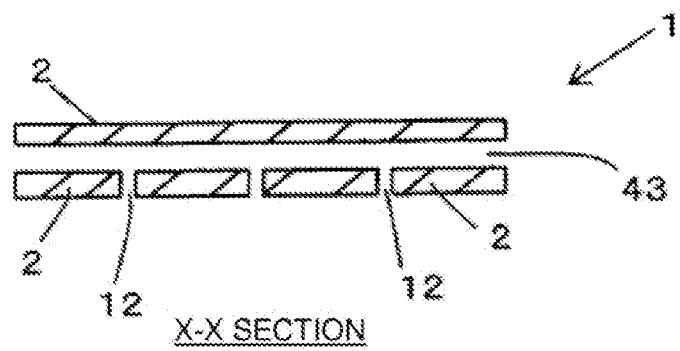

Further, for example, in the case of the two-layer structure in which the supporting body 2 in the first layer coming into contact with the seated person or the supine posture person is not separated but is formed into one surface, and the supporting body 2 in the second layer is separated into several sections as shown in FIG. 24C, it is possible to make the seated person or the supine posture person hard to feel the separation of the supporting body 2.

Next, a description will be given of the sub-supporting body 4.

Figure 22A:
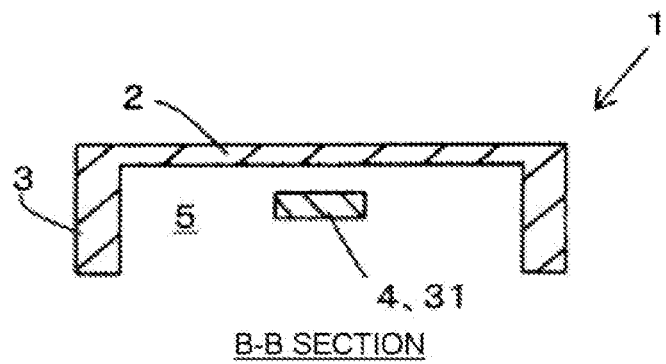
Figure 22B:
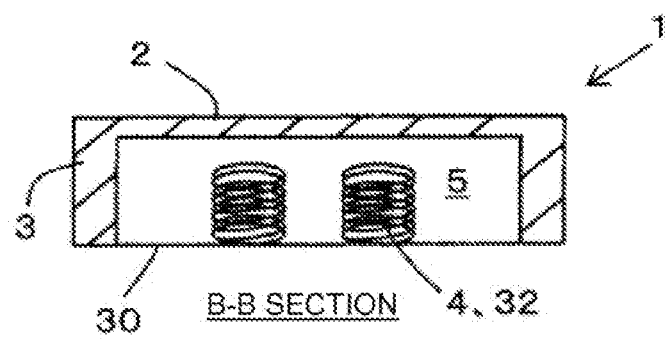
Figure 22C:
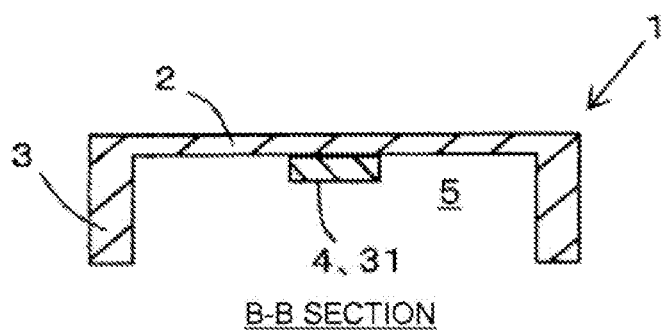

The sub-supporting body 4 constructed by the elastic body is arranged in the direction in which the supporting body 2 of a plurality of rod-like elements 10 or a plurality of flat plate-like elements 11 is pressed, so as to be separated from the supporting body 2 as shown in FIGS. 22A and 22B, or so as to be brought into contact with the supporting body 2 as shown in FIG. 22C, and the deflection amount caused by the bending deformation of the supporting body 2 is suppressed by the sub-supporting body 4. Further, the sub-supporting body 4 is constructed by a mode that a linear or band-like elastic body is extended to a frame body, an S-type spring, a leaf spring and a coil-like spring body made of resin or metal, a member obtained by weaving the synthetic resin such as polyester at a high density or a rubber.

In the case that the sub-supporting body 4 is arranged so as to be separated from the supporting body 2, the sub-supporting body 4 compresses, bends or deforms by bending, after the supporting body 2 deforming by bending and deflecting due to the load of the seated person or the supine posture person comes into contact with the sub-supporting body 4. Therefore, the sub-supporting body 4 achieves a good comfortable sit feeling and a good comfortable sleep feeling on the basis of the bending deformation of the supporting body 2 and the bending of the leg body 3 in the case that the pressure applied by the seated person or the supine posture person to the supporting body 2 is low, and achieves the good comfortable sit feeling and the good comfortable sleep feeling by adding the bending deformation of the sub-supporting body 4 to the bending deformation of the supporting body 2 and the bending of the leg body 3 in the case that the load applied to the seated person or the supine posture person to the supporting body 2 is high.

Figure 34:
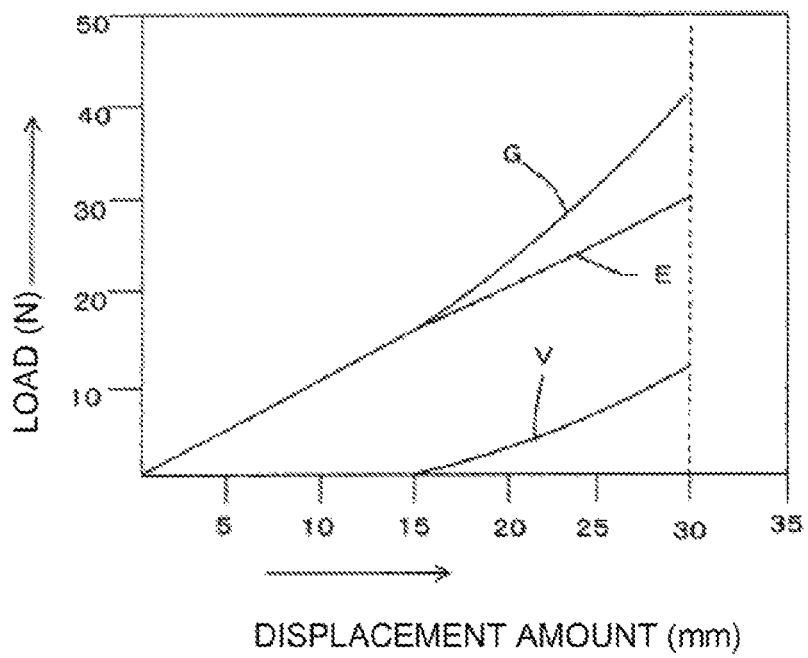
FIG. 34 is a compression-displacement amount diagram in a structure which is provided with the band-like sub-supporting body shown in FIG. 22A.

FIG. 34 shows an example in which the cushion body 1 corresponding to a test specimen having the structure of the invention provided with the sub-supporting body 4 of a band-like element 31 is actually pressed by a testing machine. FIG. 34 shows the reaction force occurred when the surface of the cushion body 1 is pressed by 30 mm using a hemispherical tool with a diameter of 100 mm at a speed of 100 mm/min. The lowest line V indicates the reaction force when only the belt of the band-like element 31 that is the sub-supporting body 4 is pressed, the central line E indicates the reaction force when only the supporting bodies 2 made of the synthetic resin foam are pressed, and the highest line G indicates the reaction force when the test specimen having the structure according to the present invention is pressed.

In the test specimen which is the cushion body 1 having the sub-supporting body 4, the belt of the band-like element 31 that is the sub-supporting body 4 is provided at a position 15 mm in a back face side direction of the supporting bodies 2 made of the synthetic resin foam. Thus, the supporting bodies 2 as a single component that are made of the synthetic resin foam and the test specimen having the structure according to the present invention generate exactly the same reaction force until being pressed by 15 mm with the test tool. Thereafter, the supporting bodies 2 made of the synthetic resin foam come into contact with the sub-supporting body 4 of the band-like element 31, and the reaction force occurred by each of the supporting body 2 made of the synthetic resin foam and the sub-supporting body 4 of the band-like element 31 is mixed, increasing rigidity gradually.

Next, a description will be given of the synthetic resin foam. The synthetic resin foam in the present invention indicates a synthetic resin foam molding that is flexible to be deformed by bending and excellent in the restoration properties. The bending deflection thereof measured in accordance with the method described in JIS K7221-2: 2006 (in the atmosphere of 23° C.±2° C. and relative humidity of 50±5%, a test specimen whose skin is removed having a length of 350 mm, a width of 100 mm, and a thickness of 25 mm is subjected to a load applied at a test speed 20±1 mm/min with a distance between the supporting points 6 of 300 mm until the deflection reaches 90 mm at maximum, and the load deflection curve is recorded) is equal to or larger than 20 mm, and the load when deflected by 20 mm is 2 to 100 N. The synthetic resin foam molding having breakage with bending deflection of smaller than 20 mm is inappropriate from the view of durability. When the cross section of the supporting body 2 necessary to support the pressure of the body is significantly large and the load when deflected by 20 mm goes beyond 100 N, it is difficult to generate a preferable deflection amount and achieve preferable design. More specifically, the synthetic resin foam indicates a polypropylene foam, a polyethylene foam, and other polyolefin resin foams, or a modified polystyrene resin foam. Among the above foams, the in-mold molding of resin foam particles is preferable from the view of the degree of freedom of form (easiness in design) taking the fitting feeling into consideration.

The polyolefin resin constituting foam particles used in the present invention is a polyolefin resin having olefin component units as a main component. More specifically, there can be exemplified polypropylene resin, polyethylene resin, and a mixture of such two kinds or more. The above "as a main component" means that 50 mass % or more of olefin component units is contained in the polyolefin resin. The contained amount is preferably equal to or more than 75 mass %, more preferably equal to or more than 85 mass %, and further preferably equal to or more than 90 mass %.

The polypropylene resin is exemplified by resin containing 50 mass % or more of propylene component unit, and is propylene homopolymer, or copolymer with other olefin that is copolymerizable with propylene. Other olefin that is copolymerizable with propylene is exemplified by ethylene and 4-10C α-olefin such as 1-butene, isobutylene, 1-pentene, 3-methyl-1-butene, 1-hexene, 3, 4-dimethyl-1-butene, 1-heptene, and 3-methyl-1-hexene. The above-described copolymer may be random copolymer or block copolymer, and further may be not only binary copolymer but also ternary copolymer. Other olefin that is copolymerizable with propylene in the above-described copolymer is preferably contained at a ratio of 25 mass % or less, and particularly 15 mass % or less. The lower limit value is preferably 0.3 mass %. Furthermore, such polypropylene resin can be used individually or as a mixture of two kinds or more. The polypropylene resin is desirable to be a resin foam obtained by foaming of base resin having 600 MPa or higher in value of a tensile elastic modulus (E) defined in JIS K7161: 1994 (test specimen: test specimen 1A described in JIS K7162 (1994) (molded directly by injection molding), test speed: 1 mm/min).

The polyethylene resin is exemplified by resin containing 50 mass % or more of ethylene component units, and is high density polyethylene, low density polyethylene, linear low density polyethylene, ethylene-vinyl acetate copolymer, ethylene-propylene copolymer, ethylene-propylene-1-butene copolymer, ethylene-1-butene copolymer, ethylene-1-hexene copolymer, ethylene-4-methyl-1-pentene copolymer, and ethylene-1-octene copolymer, for example, and a mixture of two kinds or more of them.

Then, with regard to the concrete selection of the synthetic resin foam, when a rod-like test specimen having a length of approximately 400 mm is further held at the part of both ends thereof and kept for 30 minutes after the center of the test specimen is pressed down about 25 mm, and then the load is released, the material preferably has restoration from deformation of the sample by 90% or higher. Alternatively, when the center portion of the sample held at the part of both ends thereof is pressed down repetitively a predetermined number of times and deformed, in accordance with the test conventionally performed for the seat cushion made of a polyurethane foam, the material preferably has residual distortion measured thereafter of a predetermined amount or smaller. The predetermined number of times and the predetermined amount are in accordance with specifications optionally defined when each manufacturer conventionally select materials.

As material satisfying such conditions, a polypropylene foam with density of 0.06 g/cm³ to 0.015 g/cm³, and more preferably with density of 0.035 g/cm³ to 0.015 g/cm³, or a polyethylene foam with density of 0.08 g/cm³ to 0.03 g/cm³ are preferable, for example. Such materials have a load when deflected by 20 mm of 2 to 100 N in the test performed in accordance with the method described in JIS K7221-2: 2006 (in the atmosphere of 23° C.±2° C. and relative humidity of 50±5%, a test specimen whose skin is removed having a length of 350 mm, a width of 100 mm, and a thickness of 25 mm is subjected to a load applied at a test speed 20±1 mm/min with a distance between the supporting points 6 of 300 mm until the deflection reaches 90 mm at the maximum, and the load deflection curve is recorded), and is excellent in the bending rigidity as well as the flexibility relative to the bending. On the other hand, the soft flexible polyurethane foam used generally and conventionally is significantly inferior in the bending rigidity of 0.46 N, and thus is not appropriate as the material constituting the cushion body 1 according to the present invention.

Figure 33:
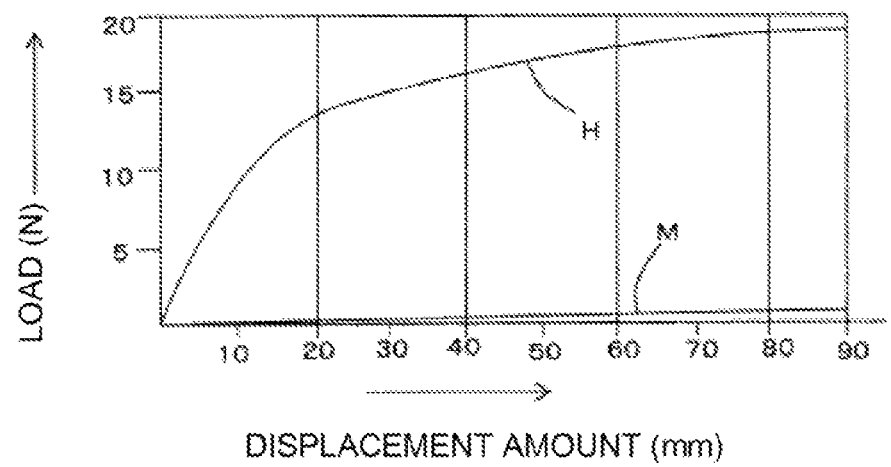
FIG. 33 is a comparison diagram between a foam and a non-foam in a bending test in accordance with JIS K7221-2.

Next, FIG. 33 is a load-displacement amount diagram when the polypropylene foam is selected as an example of a synthetic resin foam, and a sample of a non-foaming resin plate (thickness of 1 mm) and a sample of a foaming polypropylene foam 45 times foam (thickness of 45 mm), which are made of same resin, are supported at both ends thereof, and the center portions thereof are pressed down, in accordance with JIS K7221-2: 2006 (in the atmosphere of 23° C.±2° C., and relative humidity of 50±5%, a test specimen whose skin is removed having a length of 350 mm, a width of 25 mm, the same sample weight, and an optional thickness is subjected to a load applied at a test speed 20±1 mm/min with a distance between the supporting points 6 of 300 mm until the deflection reaches 90 mm at the maximum, and the pressure deflection curve is recorded). The width was made constant to 25 mm, and the thickness was adjusted so that the weight of the samples is same. The case of the non-foaming resin plate is shown with a load-displacement amount diagram M, and the case of the sample made of the polypropylene foam 45 times foam is shown with a load-displacement amount diagram H.

FIG. 33 shows that although the weight of both samples is equal, the bending rigidity is significantly increased when the foam is adopted. Conventionally, it is not general to use a foam as a cushion material by deforming it by bending. However, it is indicated that the use of the foam can decrease the weight of parts necessary to obtain same bending rigidity, that is, the use of the foam enables light weighting of the cushion body 1.

DESCRIPTION OF REFERENCE NUMERALS

1 cushion body
2 supporting body
3 leg body
4 sub-supporting body
5 space portion
6 supporting point
7 surface cover
8 through hole
9 pressing force (load)
10 rod-like element
11 flat plate-like element
12 interval
15 projection
16 protrusion
18 columnar body
30 rear surface portion
31 band-like element
32 coil-like element
40 material a
41 material b
43 gap
50 frame
51 bonding means
52 fastening means

What is claimed is:
1. A cushion body comprising:
a plurality of rod or flat plate supporting bodies which are constructed by synthetic resin foamed beads molding having a bending deflection amount equal to or larger than 20 mm and a pressure between 2 and 100 N at the 20 mm bending deflection time, both the bending deflection amount and the pressure being measured in accordance with a method described in JIS K7221-2: 2006, in an atmosphere of 23° C.±2° C. and relative humidity of 50±5%, a test specimen is used whose skin is removed having a length of 350 mm, a width of 100 mm, and a thickness of 25 mm is subjected to a load applied at a test speed 20±1 mm/min with a distance between supporting points of 300 mm until the deflection reaches 90 mm at the maximum, during which the load deflection curve is recorded,
wherein the cushion body is structured such that a space portion is formed below said supporting bodies so that the supporting bodies are allowed to be deformed by bending, and said plurality of supporting bodies are lined up so that they can be deformed by bending;
further comprising a frame supporting said supporting bodies,
wherein said supporting bodies are fitted to said frame, mounted to said frame or fixed to said frame, and said supporting bodies are constructed as a cantilever beam structure, a both-end supported beam structure or a three-point or more supported structure.
2. A cushion body comprising:
a plurality of rod or flat plate supporting bodies which are constructed by synthetic resin foamed beads molding having a bending deflection amount equal to or larger than 20 mm and a pressure between 2 and 100 N at the 20 mm bending deflection time, both the bending deflection amount and the pressure being measured in accordance with a method described in JIS K7221-2: 2006, in an atmosphere of 23° C.±2° C. and relative humidity of 50±5%, a test specimen is used whose skin is removed having a length of 350 mm, a width of 100 mm, and a thickness of 25 mm is subjected to a load applied at a test speed 20±1 mm/min with a distance between supporting points of 300 mm until the deflec- tion reaches 90 mm at the maximum, during which the load deflection curve is recorded, wherein the cushion body is structured such that a space portion is formed below said supporting bodies so that the supporting bodies are allowed to be deformed by bending, and said plurality of supporting bodies are lined up so that they can be deformed by bending, and further comprising a leg body supporting said supporting bodies, wherein said supporting bodies are fitted to said leg body, mounted to said leg body, fixed to said leg body or integrally formed with said leg body, and said supporting bodies are constructed as a cantilever beam structure, a both-end supported beam structure or a three-point or more supported structure.

3. The cushion body according to claim 1, wherein said leg body has a shape which is bent at a single time or plural times, on a line which connects a supporting point in one end side coming into contact with the supporting body and a supporting point of the leg body leading end in the other end side.

4. The cushion body according to claim 1, wherein said supporting body has a linear shape, a curved shape or a bent shape.

5. The cushion body according to claim 1, wherein said supporting body is constructed as a laminated structure.

6. The cushion body according to claim 1, wherein said leg body is pressed and stopped its one end in the supporting body side by said supporting body, and is inhibited its other end from moving in a pressing direction generated by the seated person or the supine posture person, and said leg body is obtained by independently or continuously arranging the leg body formed into an approximately single linear shape structured such that a supporting point in one end side where said leg body comes into contact with the supporting body and a supporting point in a leading end of the leg body in the other end side of the leg body do not exist on the same line as the pressing direction of the supporting body.

7. The cushion body according to claim 1, wherein said supporting body is provided with through holes.

8. The cushion body according to claim 1, wherein projections or protrusions are provided in a protruding manner on a surface in a side of said supporting body.

9. The cushion body according to claim 1, wherein a sub-supporting body constructed by an elastic body is arranged in a direction in which said supporting body is pressed, so as to suppress the deflection amount caused by the bending deformation of said supporting body by being separated from said supporting body or being brought into contact with said supporting body.

10. The cushion body according to claim 1, wherein said supporting body is constructed as a multilayer structure and a gap is provided between said layers.

11. The cushion body according to claim 1, wherein projections and/or protrusions are provided in a protruding manner on a rear face of said supporting body or a surface in said supporting body side of a rear surface portion facing to said supporting body.

12. The cushion body according to claim 1, wherein a columnar body having smaller reaction force at the compression time than said leg body is provided in a protruding manner on a rear face of said supporting body or a surface in said supporting body side of a rear surface portion facing to said supporting body so that a leading end portion of said columnar body is brought into contact with said rear surface or the rear face of said supporting body facing thereto.

13. The cushion body according to claim 12, wherein said columnar body is constructed by at least one material which is made of a softer material than said leg body, a material which is formed into a tapered shape in its leading end portion, which is formed into a bent shape, or which has a smaller cross sectional area than said leg body, thereby making the reaction force smaller than the reaction force at the compression time of said leg body.

14. A cushion body comprising:

a plurality of rod or flat plate supporting bodies which are constructed by synthetic resin foam having a bending deflection amount equal to or larger than 20 mm and a pressure between 2 and 100 N at the 20 mm bending deflection time, both the bending deflection amount and the pressure being measured in accordance with a method described in JIS K7221-2:2006, in an atmosphere of 23° C.±2° C. and relative humidity of 50±5%, a test specimen is used whose skin is removed having a length of 350 mm, a width of 100 mm, and a thickness of 25 mm is subjected to a load applied at a test speed 20±1 mm/min with a distance between supporting points of 300 mm until the deflection reaches 90 mm at the maximum, during which the load deflection curve is recorded, wherein the cushion body is structured such that a space portion is formed below said supporting bodies so that the supporting bodies are allowed to be deformed by bending, and said plurality of supporting bodies are lined up so that they can be deformed by bending and the synthetic resin foam is a polyolefin foam or a modified polystyrene foam.

15. The cushion body of claim 14, wherein the polyolefin foam is polyethylene foam or polypropylene foam.

16. The cushion body of claim 15, wherein the synthetic resin foam is synthetic foamed beads molding.

17. The cushion body of claim 14, wherein the synthetic resin foam is a polyolefin foamed beads molding.

18. The cushion body of claim 14, wherein the synthetic resin foam is synthetic foamed beads molding.

* * * * *